July 1, 1958 F. G. STEELE ET AL 2,841,328
DIGITAL DIFFERENTIAL ANALYZER
Filed March 6, 1950 9 Sheets-Sheet 1

INVENTORS:
FLOYD G. STEELE
RICHARD E. SPRAGUE
BERNARD T. WILSON
BY
Herbert E. Metcalf
ATTORNEY July 1, 1958     F. G. STEELE ET AL     2,841,328
DIGITAL DIFFERENTIAL ANALYZER

INVENTORS:
FLOYD G. STEELE
RICHARD E. SPRAGUE
BERNARD T. WILSON

BY Herbert E. Metcalf
ATTORNEY

INVENTORS:
FLOYD G. STEELE
RICHARD E. SPRAGUE
BERNARD T. WILSON

BY Herbert E. Metcalf
ATTORNEY

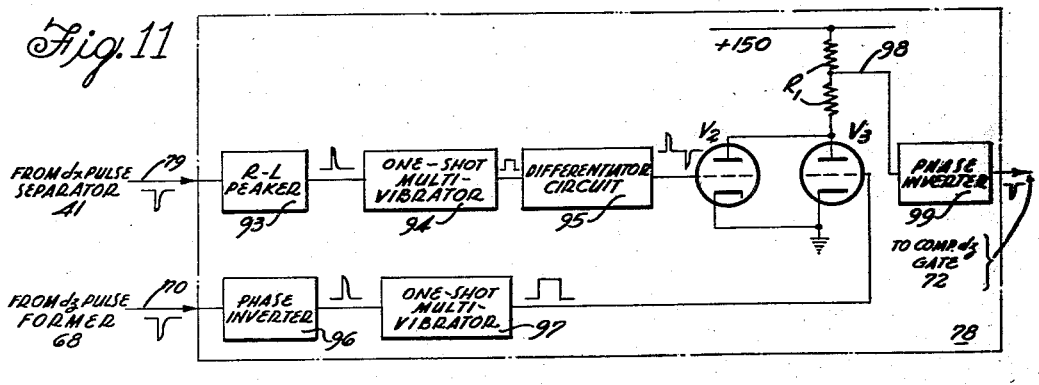
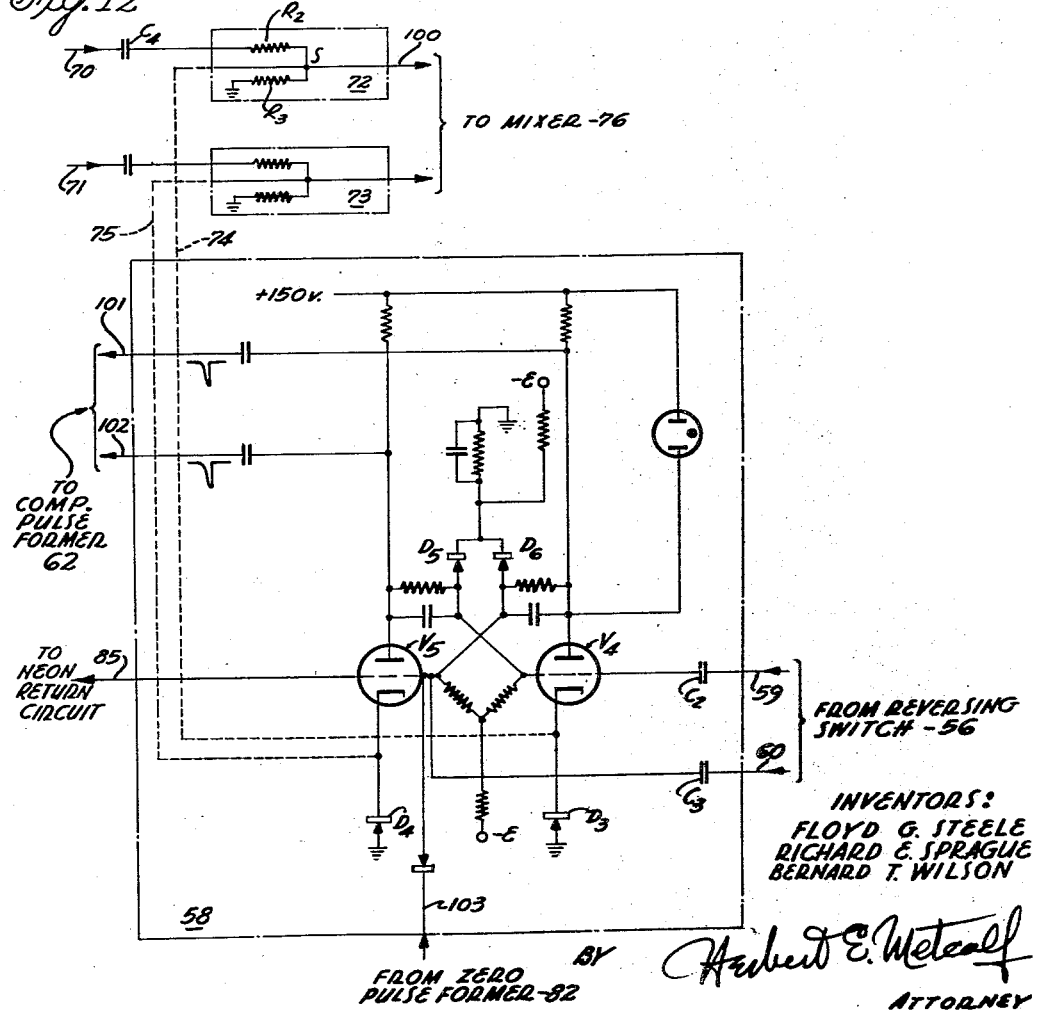

FROM ZERO PULSE FORMER 82

COUNTER 24

| NUMBER OF dx PULSES | FIRST STAGE | SECOND STAGE | THIRD STAGE | FOURTH STAGE | ----- | $n^{th}$ STAGE |
|---|---|---|---|---|---|---|
| 0 | H | H | H | H | | H |
| 1 | L | H | H | H | | H |
| 2 | H | L | H | H | | H |
| 3 | L | L | H | H | | H |
| 4 | H | H | L | H | | H |
| 5 | L | H | L | H | | H |
| 6 | H | L | L | H | | H |
| 7 | L | L | L | H | | H |
| 8 | H | H | H | L | | H |
| 9 | L | H | H | L | | H |
| 10 | H | L | H | L | | H |
| 11 | L | L | H | L | | H |
| 12 | H | H | L | L | | H |
| 13 | L | H | L | L | | H |
| 14 | H | L | L | L | | H |
| 15 | L | L | L | L | | H |
| --- | --- | --- | --- | --- | | --- |
| $2^n-2$ | H | L | L | L | | L |
| $2^n-1$ | L | L | L | L | | L |
| $2^n$ | H | H | H | H | | H |

INVENTORS:
FLOYD G. STEELE
RICHARD E. SPRAGUE
BERNARD T. WILSON

BY
Herbert E. Metcalf
ATTORNEY

July 1, 1958  F. G. STEELE ET AL  2,841,328
DIGITAL DIFFERENTIAL ANALYZER
Filed March 6, 1950  9 Sheets-Sheet 7

INVENTORS:
FLOYD G. STEELE
RICHARD E. SPRAGUE
BERNARD T. WILSON
BY
Herbert E. Metcalf
ATTORNEY

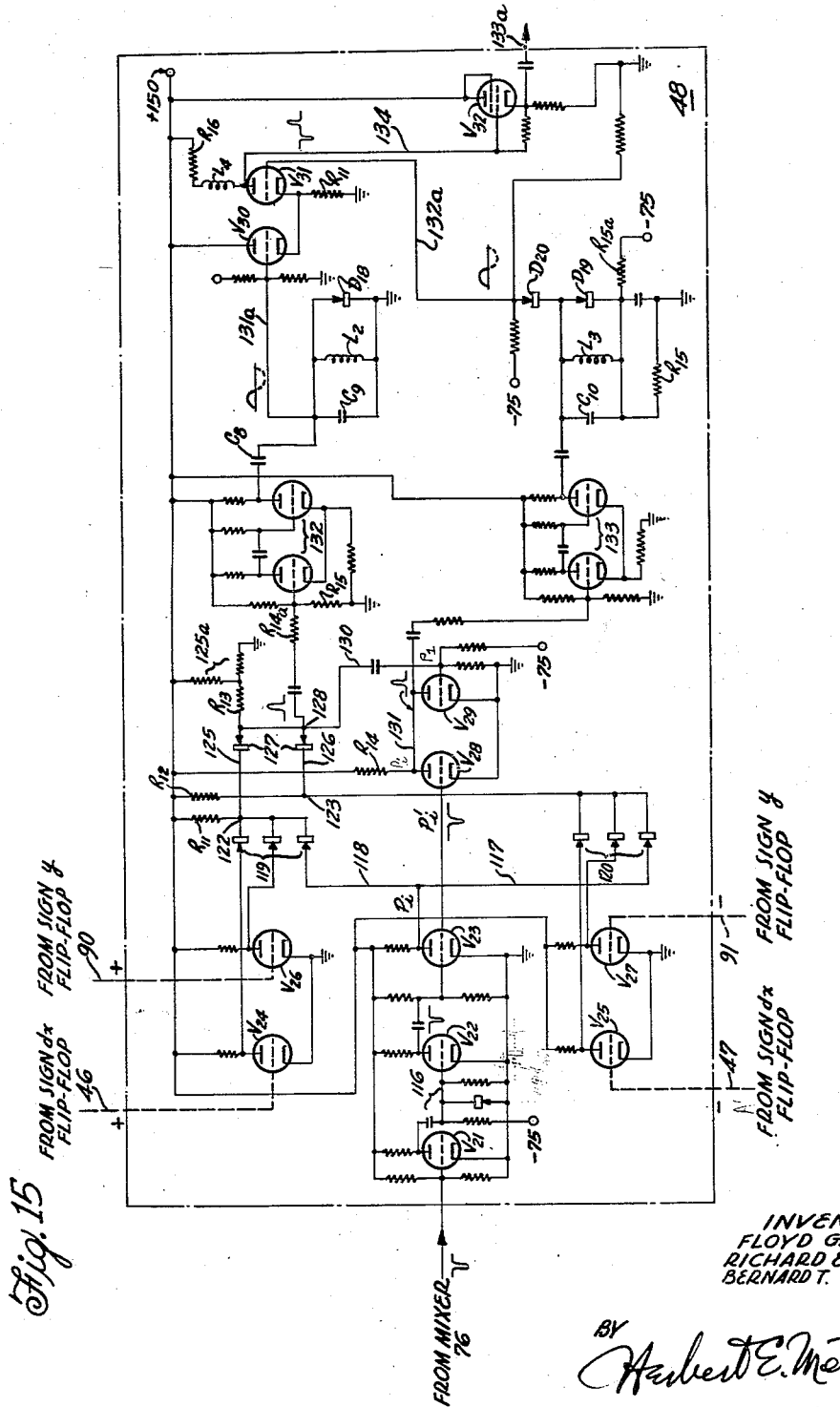

July 1, 1958 F. G. STEELE ET AL 2,841,328
DIGITAL DIFFERENTIAL ANALYZER
Filed March 6, 1950 9 Sheets-Sheet 9

INVENTORS:
FLOYD G. STEELE
RICHARD E. SPRAGUE
BERNARD T. WILSON
BY
Herbert E. Metcalf
ATTORNEY

2,841,328

Patented July 1, 1958

2,841,328
DIGITAL DIFFERENTIAL ANALYZER

Floyd G. Steele, Manhattan Beach, and Richard E. Sprague and Bernard T. Wilson, Los Angeles, Calif., assignors to Northrop Aircraft, Inc., Hawthorne, Calif., a corporation of California Application March 6, 1950, Serial No. 147,862

73 Claims. (Cl. 235—61)

This invention relates to computers and more particularly to a novel means and method of performing the process of differential analysis.

In differential analysis devices it is desired to generate solutions to differential equations, i. e., equations whose variables are related and expressed in the form of derivatives and differentials.

In general, two generic classes of computers have heretofore bene known. One of these is the analogue computer, sometimes referred to as the continuous variable type computer, which is best known and demonstrated in its mechanical embodiment as the Kelvin wheel-and-disc integrator. The other of these classes is the digital computer. This latter class is further characterized by the fact that it employs, for example, electrical signals for representing numerical digits.

The present invention is primarily concerned with a novel means and method of performing the process of differential analysis which may be considered broadly as a hybrid of these two previous types.

On examining these devices for performing integration it becomes readily apparent that the character of approach of the analogue computer, for example the wheel-and-disc type integrator, is more direct and much simpler than that of the digital computer. This is because the wheel-and-disc integrator operates directly upon a differential equation as it is ordinarily written. It operates by methods of the calculus.

The digital computers, on the oher hand, require that a differential equation can be transformed into a numerical form before it can be solved. An elaborate memory system is needed for storing subroutine numbers and orders. The preparation for setting up the equation in the computer is generally quite difficult and lengthy.

Thus it is seen that of the two classes of computers, it is the logic of the analogue computer that is most clearly a part to that body of mathematics, calculus, which it seeks to augment.

The digital computers, however, have many advantageous features. After once getting a problem coded for a digital computer, the problem can be solved on it in a very short time, much shorter than on the analogue computers. This is due to the fact that digital computers embody the advantages of extremely fast acting electronic operations. Furthermore, the digital computers are inherently more accurate than the analogue computer. By representing magnitudes of variables by pulses, rather than proportional voltages, rotations of shafts, etc., the digital computers have the abstract property of working with numbers and thus the computations on them can proceed with all the rigorous accuracy associated with numbers.

Thus it is made evident that it would be highly desirable to have an integrating device which could embody the simplified, direct logical approach to a differential equation employed in the analogue computers while also gaining the advantage of speed and accuracy associated with the digital computers.

In order for a differential analyzer to have these desirable features, it has been determined that a single fundamental integrating unit must satisfy certain requirements which, although they are all inherent in a mechanical manner in the wheel-and-disc type, must also be incorporated in an electronic digital manner in the proposed device. These requirements for an integrating device are as follows:

(a) It must receive two independent inputs of varying magnitude and produce from them one output of varying magnitude.

(b) If the time rates of change of the input magnitudes are called $$\frac{dx}{dt}$$

and $$\frac{dy}{dt}$$

the time rate of change of the output magnitude must be $$\frac{dz}{dt}$$

where the relation of the variables is such that $$\frac{dz}{dt}=Ky\frac{dx}{dt}$$

K being a constant which may be associated with the integrator.

(c) Both of the inputs, and the single output must all be of like nature, just as the wheel-and-disc type represents magnitudes by shaft rotation, the present integrator must represent magnitudes by sums of electronic pulses.

(d) To simulate mathematical processes, the magnitudes involved must be capable of assuming values defined as positive or negative in sign.

It is therefore the object of this invention to provide an integrating device having the requirements above set forth as being desirable and others which will be made clear in the following specification.

Briefly, the present invention comprises a counter for storing a number whose magnitude is being varied by a first pulse train feeding into the counter. A transfer device is provided for repeatedly transferring the existing number in the counter in accordance with a second pulse train. The nature of the transfer being such that the number transferred is retained in the counter. The above action is used to generate a third pulse train such that the time rate of pulses of the third train with respect to the time rate of pulses on the second train is varied in accordance with the magnitude of the number transferred from the counter.

Associated with the above, circuits are provided for enabling the effective number in the counter to increase or decrease in accordance with positive and negative polarity pulses of the first train, the polarity of the pulses being used to indicate the sign. The sign arrived at by the number in the counter is then sensed along with the sign or polarity of the pulses on the second train and is thus used to determine the sign or polarity of the pulses on the third train.

The present invention is a typical example of mathematical machines that are widely used because they can perform certain calculations more swiftly than any human calculator could by use of brain and hand. Mathematical machines can be defined as mechanisms which provide information concerning the relationships between a specified set of mechanical concepts. But it is to be kept in mind that mathematical machines such as described herein can only practice methods which are capable of being performed by hand, provided only that sufficient time and manpower are available. It is mainly for conservation of time and manpower that the methods involved are incorporated in specific apparatus that is abstractedly equivalent to a laborious and and time consuming original system.

This invention will be more fully understood by reference to the following description of the appended drawings, in which:

Figure 11 is a diagram, partly schematic, showing the $dz$ pulse complementing circuit.

Figure 12 is a schematic wiring diagram of the complement flip-flop circuit and the normal and complement gates; and shows in particular the internal points of connections of associated circuits.

Figure 15 is a schematic wiring diagram of the $dz$ output pulse former and sign changer circuit.

Figure 1:
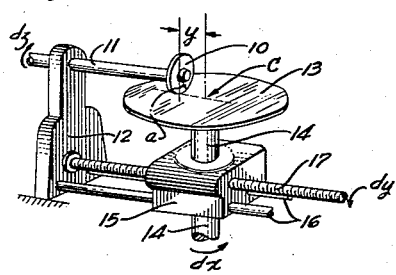
Figure 1 is an illustration for depicting the theory of operation of the wheel-and-disc type integrator.

Referring first to Figure 1, the well-known mechanical wheel-and-disc type analogue integrator is illustrated as an aid in explaining the theory of operation of the present invention. There a vertical wheel 10 has attached at its center one end of a horizontal shaft 11. Horizontal shaft 11 is cantilevered from a fixed bearing pedestal 12 in which it is rotatably mounted. It should be noted that the shaft 11 is carefully restrained from moving axially with respect to the pedestal 12. The periphery of vertical wheel 10, whose plane is thus fixed, rests on a horizontal disc 13 which can be rotated about the axis of a vertical shaft 14 extending downwardly from its center. Vertical shaft 14, in turn, is rotatably supported in a movable carriage 15 which is connected so that it can be driven along horizontal guide rails 16 by the rotation of a lead screw 17. This action enables the distance of the point of contact of the wheel 10 on the disc 13, from the center C of the disc 13, to be varied; since the carriage 15 can be moved horizontally with respect to bearing pedestal 12 while the wheel 10 is always at a fixed distance with respect to the bearing pedestal 12.

Consider the point of contact of wheel 10 and disc 13 to be, at a given instant, a distance $y$ from the center C of disc 13. If the disc 13 rotates through a small fraction of a turn, say $dx$, due to a rotation on the vertical shaft 14, the wheel 10 will rotate through $y dx/a$ turns. This rotation of the wheel 10 is evidenced as an equivalent small fraction of a turn, say $dz$, on the horizontal shaft 11. In the above expression, $a$ is the radius of the wheel 10.

If the distance $y$ is now varied by a small fraction of a turn, say $dy$, on the lead screw 17 while the disc 13 is rotating, the total rotation of the wheel 10 and consequently the horizontal shaft 11 is the sum of each of the contributions $y dx/a$, that is, $\int y dx/a$ turns. It is to be noted here that $1/a$ can be taken outside of the integral sign, since it is a constant, and may be designated generally as the constant K.

This completes the description of the analogue integrator which enables one to produce solutions to differential equations mechanically and which has been presented herein to introduce the logic of the digital integrator of the present invention.

The proportionality characteristic common to all analogue devices exists in the wheel-and-disc integrator between shaft rotations and the variables of the differential equation. Each variable in the equation is represented somewhere in the machine by a rotating shaft. The total angle of rotation of a shaft from some reference position is proportional to the magnitude of the variable. The sign of the variable is denoted by clockwise or counter-clockwise rotation from the reference position. The rate of rotation of the shaft is proportional to the time derivative of the variable, and again, the direction the shaft is rotating determines the sign of the derivative. The independent variable shaft for one integrator, which in this case is vertical shaft 14, corresponds to the variable $x$ and is generally driven by a motor; and the ratio of the speed of rotation of any other shaft, say the lead screw 17 (which corresponds to the variable $y$) to the vertical shaft 14 is always proportional to $dy/dx$.

This operation may be further understood by considering derivatives and integrals separately. If the speed of rotation of the independent variable shaft 14 is, for example, defined as $dx/dt$ and it rotates for $t$ seconds through the range $x_1$ to $x_2$, its total rotation would be $$(x_2-x_1) = \int_{x_1}^{x_2} dx$$

In other words, the speed of rotation of the shaft is proportional to the time derivative $$\frac{dx}{dt}$$

of the variable $x$; and the total rotation $(x_2-x_1)$ of the shaft is proportional to the integral of $dx$.

In the mechanical integrator, as described, the lead screw 17 is connected in such a manner as to vary, at a $$\frac{dy}{dt}$$

rate, the position of the contact point of the wheel 10 with respect to the center C of the disc 13. The disc 13 is rotated by the independent variable shaft 14 at a speed $$\frac{dx}{dt}$$

The disc 13 "drives" the wheel 10 in such a manner that its speed $$\frac{dz}{dt}$$

is proportional to the product of the distance $y$ and the speed $$\frac{dx}{dt}$$

Regarded in this sense, the integrator is a multiplier. Since the output speed $$\frac{dz}{dt} = \frac{1}{a} y \frac{dx}{dt}$$

as above shown; the total output rotation $$Z = \frac{1}{a} \int_{x_2}^{x_1} y \, dx$$

Because of these facts the speeds of each of the shafts may be rightly defined as being proportional to the time derivative, or rate of change, of the variable it represents. It is also proper and proves to be advantageous in understanding the present invention to treat the speeds of the shafts as being proportional to the differentials of the variables, since the time term, though always implicit, cancels out.

Figure 2:
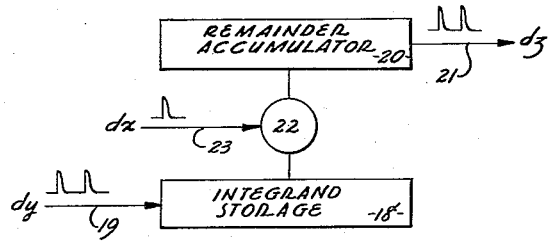
Figure 2 is a schematic diagram for depicting the theory of operation of the digital counterpart of the integrator in Figure 1.

Referring to Figure 2, the basic digital integrating circuit of the present invention is schematically illustrated there and will now be generally described. This circuit is composed, in general, of three elements: a first counter functioning as an integrand storage 18 and having an input lead 19; a second counter functioning as a remainder accumulator 20 and having an output lead 21; and, a transfer device 22 which has a second input lead 23. Transfer device 22 serves the function of transferring the existing number $y$ from the integrand storage 18 into the remainder accumulator 20 each time a pulse input is received on second input lead 23.

Each electrical pulse, designated $dy$, received on the input lead 19 to the integrand storage 18, represents a small unit increase of the integrand $y$ and causes the integrand storage 18 content to increase by one. The nature of the transfer device 22 is such that as each input pulse, representing the variable of integration $dx$, is received on second input lead 23; the number $y$ existing in the integrand storage 18 is transferred in an additive manner to the number in the remainder accumulator 20 while still being retained in the storage 18.

The remainder accumulator 20 has a given capacity, in this case of the same capacity as the integrand storage 18. As the existing $y$ number is continuously added into the remainder accumulator 20, as dictated by the $dx$ inputs, the accumulator 20 soon reaches its capacity. Its output lead 21 then emits an output pulse $dz$, and accumulator 20 starts to count from zero again. It is to be noted that in forming the differential combination of the dependent quantity $y$ with a variation in the independent quantity $dx$ (as shown in Figure 2) the value of the dependent quantity $y$ registered in the storage 18 is registered in the accumulator 20 in full significance when $dx$ has a value of one. That is, the registration of the value held in the storage 18 by the accumulator 20 is unlike the accumulation or registration of partial products which occurs in a conventional multiplication. This is so because there is no prearranged orderly shifting of the signals registered, to thereby alter the significance attached to the quantity $y$ as it is repeatedly registered in the accumulator 20, as would be the case in the accumulation of partial products.

It is to be noted that the integrand storage 18 does not provide for an overflow output, its capacity limits the maximum value of $y$ which can be transferred in the remainder accumulator 20.

The nature of the transfer device 22 can take any one of several possible forms, in transferring the $y$ number out of the integrand storage, such as series, parallel, or stagger additive transfer. In the embodiment of the present invention which is to be described in detail in the ensuing discussion, a series additive transfer is utilized.

The counters used in the digital integrating circuit for the storage 18 and the accumulator 20 can be either of a decimal, binary or any other radix desired as long as they are both consistent. However, in the embodiment of the invention which is to be described in detail, binary counters are used since they present certain advantages when used with other chosen components of the circuit.

The similarity of the digital integrator circuit of the present invention to the previously described wheel-and-disc integrator is now revealed in several aspects.

The basic idea of the present invention, in accordance with the foregoing, is in the representation of a variable by a train of electronic pulses on a conductor instead of a shaft rotation.

The rate at which these electrical pulses appear on a conductor corresponds to the speed of rotation of a shaft on the wheel-and-disc integrator, i. e., is proportional to the derivative of the variable. The total number of pulses on a conductor in any interval is proportional to the change in the magnitude of the variable during the interval.

Further, in the mechanical integrator, the relative position of the wheel 10 on the disc 13, which corresponds to the variable $y$, can be thought of as a memory device, i. e., it stores a single number $y$ which is being changed in magnitude in accordance with the $$\frac{dy}{dt}$$

rate of rotation of the dependent variable lead screw 17. The integrand storage 18 of the digital integrator plays the same role, i. e., it sums the pulses received on the input lead 19 and stores the number $y$ thus obtained.

Similarly, the radius $a$ of the wheel 10 which appears as a constant $1/a$ in the output expression from the mechanical integrator may be thought of as a fixed rate changer, i. e., its magnitude reduces, or gears down the speed of rotation $dz$ of the output shaft 11. In the digital integrator, the remainder accumulator functions in this same manner, its capacity expressed in binary notation as $2^n$, appears as a constant $$\frac{1}{2^n}$$

in the output expression and, as will be seen, reduces the rate of the $dz$ pulses fed out on the output lead 21.

Figure 3:
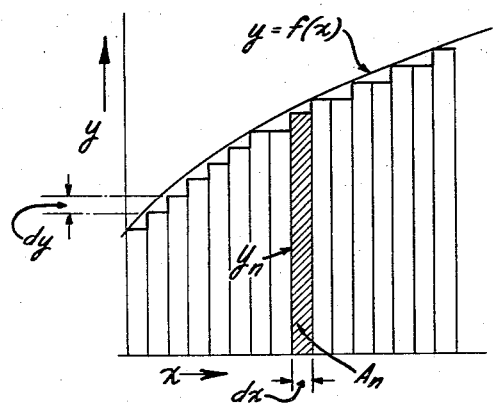
Figure 3 is a graph illustrating, generally, how the present invention performs the process of integration.

In order to further understand how the digital integrating circuit performs the integrating process, digital integration will be described as a limiting process of finding the area under a curve $y=f(x)$ which is identified only as a set of numerical values of the ordinate corresponding to a set of successive values of the abscissa. As shown in Figure 3, this is accomplished by creating a succession of adjacent incremental rectangular sub-areas such as the cross-hatched area $A_n$. The height of each rectangular sub-area $A_n$ can vary in steps equivalent to fixed increments dry so that, for instance, its left ordinate $y_n$ ends to intersect the curve $f(x)$; the width of all the sub-areas is equal and is determined by the value fixed for the increment $dx$. The total area, which is the sum of the sub-areas, corresponds to the approximated integral. It is seen that this method of defining integration can be approximated to any degree of accuracy desired by decreasing the value of the increment assigned to each $dx$ and, of course, $dy$ which is of the same order.

In the present embodiment of the invention, making use of the fast acting electronic equipment, the value of $dx$, or the increment for any other variable, can be assigned very small values.

Thus, although the rate of change of a variable is, in fact, a discrete step in the logic of the digital integrator, these steps are made as small as needed to obtain the required accuracy so that, for all practical purposes, the continuously variable rate of change of the variable, the essential feature of the calculus is, in effect, preserved.

Referring back to Figure 2, digital integration of the area under the curve $y=f(x)$ is performed by the circuit there presented by summing the incremental variable rectangular sub-areas $A_n$ so determined in Figure 3. Since the incremental $dx$, in determining each incremental sub-area, defined as $ydx$, is fixed throughout an integration, $dx$ can be assumed to be dropped out of the notation by being assigned the value "one." This in no way effects the proportionality of an ordinate $y$ to its corresponding sub-area.

Thus, each time a $dx$ pulse is received on second input lead 23 to the integrator circuit, a digit "one" may be considered to be received.

Referring to Figure 3, it is noted that the change in height, of a sub-area $A_n$, i. e. the change in magnitude of the successive ordinates $y$ is to be made in very small fixed steps denoted as $dy$.

Since each $dy$ pulse received on the input lead 19 of the digital integrator increases the number in the integrand storage 18 by one unit, it is, similarly to the $dx$ input pulse, considered as a digit "one" input to the integrator circuit.

The digital integrator of Figure 2 can thus be considered to have two "one" inputs, one of which, $dy$, is proportional to the incremental change in height of the sub-area $A_n$; and the other of which, $dx$, is the instruction to cumulate.

As the sub-areas corresponding to the $y$ ordinates are successively cumulated in the remainder accumulator 20 of Figure 2, each time the capacity of the accumulator 20 is reached, a carry out pulse $dz$ is emitted on the output lead 21.

The carry out pulse $dz$, which is likewise to be considered as a digit "one" in the logic of the digital integrator, will be due to a pulse accumulation corresponding to a number N where N is one greater than the largest number which either the accumulator 20 or the storage 18 will hold. In other words, $$N=2^n, \text{ where } 2^n-1$$

is the number in a binary accumulator, say, when all of the stages contain the digit one. Anytime a carry out pulse $dz$ is emitted as a "one" digit on output lead 21, a remainder term of $$\frac{r}{N}$$

which is always less than "one," is left in the accumulator 20. The next transfer of a $y$ number from the storage 18 thus adds to the remainder $$\frac{r}{N}$$

in the accumlator 20 and may or may not, depending on the combined value, cause a carry out pulse $dz$ on output lead 21.

Thus the digital integrator circuit performs its function by summing rectangular incremental sub-areas.

In order to further understand the operation of the digital integrating circuit, first consider that the $y$ number in the integrand storage 18 is fixed, i. e. no input pulses or "ones" appear on input lead 19.

Now then, in general, if a number $x$ represents the total number of "ones," i. e. pulses, entering on second input lead 23 for a given time interval, the total number of carry out "ones," identified as $z$, will be exactly $$Z=\frac{yx}{N}-\frac{r}{N}$$

Where N, as before noted, is one greater than the largest number which either the accumulator 20 or storage 18 will hold, the $$\frac{r}{N}$$

is the remainder term always less than "one" which is herein defined as the round-off of the increment $dz$.

It is instructive to introduce here, still assuming that $y$ is held constant, the concept of the rate at which "ones" are entering on $dx$ second input lead 23 and leaving on $dz$ output lead 21. Thus, it is noted that within the accuracy of the accumulator 20, which contains the proportional part of a "one" not appearing on output lead 21, the rate of the "ones" output is fixed with respect to the rate of the "ones" input. This is because the input $x$, as seen in the above formula, is multiplied in this case by a constant $$\frac{y}{N}$$

to obtain the output $z$.

This result is what should be expected because of the analogy of the present circuit with the wheel-and-disc integrator which is, in reality, but a variable gear. If the position of the wheel 10 were to be fixed on the disc 13, the mechanical integrator would function as a fixed gear and the change in speed of the independent variable shaft 14 to the output shaft 11 would be a constant.

Now then, consider the input rate of "ones" into the storage 18 as $$\frac{dy}{dt}$$

This can be done because a counter can be considered as a device which integrates the rate admitted to it with respect to time, i. e., $$y = \int \frac{dy}{dt} dt = \int dy$$

Since $y$ now varies in magnitude, the previous equation no longer holds. Instead, the integral or the output rate of "ones" must be expressed as:

$$z = \frac{\int y \, dx}{N} - \frac{r}{N}$$

or $$\frac{dz}{dt} = \frac{y \, dx}{N \, dt} - \frac{dr}{dt N}$$

Where the differentials $dz$ and $dx$ are not true differentials but the discrete changes in the variable as previously described.

The above equation essentially states that the rate at which the accumulator 20 produces "ones" is proportional to the product of the variable $y$ and the input rate of "ones" into the transfer device 22. The last term $$\frac{dr}{dt N}$$

corresponds to the rate of change of the round off of the increment $dz$.

Thus it can be seen that the output rate $$\frac{dz}{dt}$$

of "ones" on the $dz$ output lead 21 is now variable with respect to the input rate $$\frac{dx}{dt}$$

of "ones" on the $dx$ second input lead 23. This variableness in the rates of "ones" into and out of the machine is directly proportional to the variable number $y$, within the accuracy of the remainder term $$\frac{dr}{dt N}$$

The concept of the rate at which "ones"

$$\left(\frac{dx}{dt} \text{ and } \frac{dz}{dt}\right)$$

are entering and leaving the integrator circuit, for the case of an input rate $$\frac{dy}{dt}$$

of "ones" also, will now be further clarified. Since neither of these operations $$\left(\frac{dx}{dt} \text{ and } \frac{dz}{dt}\right)$$

need repeat at constant intervals of time, it is necessary to define some continuity which establishes an equivalent rate of change. Assume that both $x$ and $z$ are plotted against real time as a succession of points, each point being located at that instant in which its value was just changed from the previous value by the admission or emission of "one" in the integrator circuit. Pass a smooth curve through these points, for example, a polynomial of higher order, and take the time derivatives $$\frac{dx}{dt}$$

and $$\frac{dz}{dt}$$

then, these instantaneous time rates at which "ones" enter the transfer device 22 of the integrator can be defined as equal to $$\frac{dx}{dt}$$

and the instantaneous time rates at which "ones" carry out of the integrator from the accumulator 20 can be defined as equal to $$\frac{dz}{dt}$$

The concept of such rates is both useful and correct to the extent that the summation process duplicates the integrating process.

As explained in connection with the mechanical integrator, no substantial error is made in the digital integrator in considering the rate of change of a variable as being proportional to its differential instead of its derivative, since the time term, though always implicit, cancels out.

Thus, to preserve the similarly of the digital integrator to the mechanical one and to take advantage of the simple logic of the mechanical differential analyzer, inputs 19 and 23, and output 21 of the digital integrating circuit of Figure 2 have come to be known as the $dy$ and $dx$ inputs and the $dz$ output, respectively. This nomenclature persists throughout the remainder of this discussion and is adhered to both in developing the logic of the fundamental digital integrator circuit and in interconnecting several such integrator circuits to solve complex differential equations.

The numerical device just examined satisfies the first three requirements as set forth for the integrator in that it combines two input rates into the specified output rate and produces the output in kind. For example, the $dz$ output of the device can be coupled back to form its own $dy$ input to produce an exponential function. It will be noted that a "one" may serve either as an incremental "unit" or as an instruction.

Thus, the digital integrators may be considered as a set of devices which communicate between themselves in the monary or unitary number system, and which operate upon the intercommunications by means of numbers internally stored and expressed in any numbering system convenient. Numbers may be looked upon here as the means of establishing the accurately controlling "streams of ones." These "ones" are, in turn, counted to form other numbers.

The stored numbers act upon a received rate of "ones" by deleting units from it, and therefore have the nature of variable or fixed rate dividers.

The effect of an integrator is to transmit a unitary rate $dz$ which is equal to or less than the $dx$ input rate, never greater. If the value of a dependent variable, $z$, is to be found by counting the $dz$ or output rate, then, for example, between $10^4$ and $10^5$ units or pulses must be counted in order to express $z$ as a five place decimal number. If the rate reduction of the integrator is nominal, this may, ordinarily, be accomplished by the admission of no more than $10^5$ $dx$ inputs. If the rate reduction of the integrator is excessive, the number of $dx$ inputs required to achieve the same accuracy of expression for $z$ must be greater. Since the time required to perform an addition cycle in the integrator will usually be fixed, the accuracy achievable in a limited time and with a limited amount of equipment will therefore depend, among other things, upon the extent of rate reduction in the integrators.

Returning to Figure 2 and equation $$\frac{dz}{dt} = \frac{y}{N}\frac{dx}{dt} - \frac{dr}{dtN}$$

it is evident that the rate reduction ratio $$\frac{dz}{dx}$$

is essentially established by the ratio of the variable $y$ to the constant N. Therefore, $y$ must be kept as large as possible consistent with the size of the storage 18. The maximum value which $y$ takes during a computation will fill the storage 18; that is, will have a digit represented in the highest stage. At no time, of course, can the capacity of the storage 18 be exceeded. In the binary system, if the average numerical value which $y$ takes in the storage 18 during computation is half its capacity, then the average rate out is one half of the average $dx$ rate in. If this rate is allowed to cumulate in the storage 18 of another integrator, then that storage will receive enough units to fill half of its capacity. Since it will have an initial setting, however, which will occupy on the average half of its capacity, the storage will be filled.

As a consequence, the rate reduction through a series of integrations need not exceed that of a single integrator providing the scale has been correctly chose for each integrator. This principle will be demonstrated later in an example showing the hook up and describing the manner in which an embodiment of the invention can be used for generating the sine and cosine functions.

As was previously mentioned in connection with the block diagram of the fundamental integrating circuit shown in Figure 2, the additive transfer of the $y$ number in the storage 18 can be accomplished by series, parallel, or stagger methods.

The present embodiment of the invention accomplishes this additive transfer in a series manner as will now be described.

Figure 4:
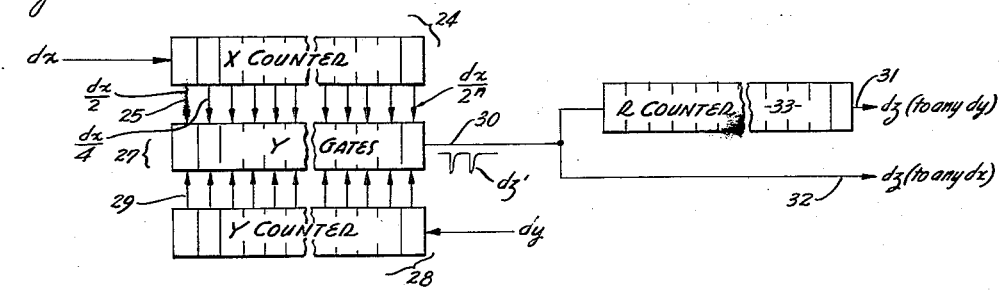
Figure 4 is a modified embodiment of the digital integrator operating in the serial, additive-transfer manner.

Referring to Figure 4, the block diagram of the series additive transfer circuit is illustrated. In effect, this circuit multiplies a pulse rate fed in on the $dx$ input line by a number $y$ held in a Y binary counter 28. This is accomplished by feeding $dx$ pulses into an X binary counter 24. Output lines 25 are taken from each of the stages in the X counter 24. Each of these output lines 25 is connected to one of the gates 27 of a bank of Y gates. A Y counter 28, which has the same number of binary stages as the X counter 24 is located below the Y gates 27. Each stage of the Y counter 28 has an output stage lead 29 which connects to one of the Y gates and opens or closes this Y gate in accordance with the state of the stage. It should be noted as shown in Figure 4 that the lowest order stage of the X counter 24 is on the left, while the lowest order stage of the Y counter 28 is on the right. Thus the $dx$ pulses are fed into the left of the X counter, while the $dy$ pulses are fed into the right in the Y counter.

Thus it can be seen that as the X counter receives $dx$ pulses, output pulses are taken from each of its stages, in accordance with the binary division of the $dx$ rate by the X stages. These output pulses are sent through Y gates 27, each of the Y gates is controlled by the stage of the Y counter directly below it. In effect, the pulses pass through these gates if the Y stages are in their one condition and do not pass if they are in their zero condition.

The Y gates 27 are connected in parallel to a gate output line 30 so that each pulse passing a Y gate 27 is fed on gate output line 30 as one of a train of pulses $dz$.

The pulse rates, fom the $dx$ input, reaching the Y gates 27 from left to right are $$\frac{dx}{2}, \frac{dx}{4}, \cdots \frac{dx}{2^n}$$

for the $n$ stages of the X counter 24 shown.

Consider the binary number $y$ appearing in the Y counter 28. If $y$ is regarded as an integer, then the Y counter may contain any integer from 0, 1, 2 etc. to $2^n-1$.

When $y=0$, all the Y stages are zero, all Y gates are closed and the output pulses $dz'$ on gate output line 30 equals $$\frac{0dx}{2^n}$$

When $y=1$, the extreme right hand Y counter stage is in its one condition, the Y gate 27 at that point is open and $$dz' = \frac{1dx}{2^n}$$

When $y=2$, the $(n-1)$th Y stage from the left is one, and the rate through its Y gate makes $$dz' = \frac{2dx}{2^n} = \frac{dx}{2^{n-1}}$$

When $y=2^n-1$, all the Y counter stages are one, all Y gates 27 are open, and the output rate is $$dz' = \frac{(2^n-1)}{2^n}dx$$

Figures 13, 19:
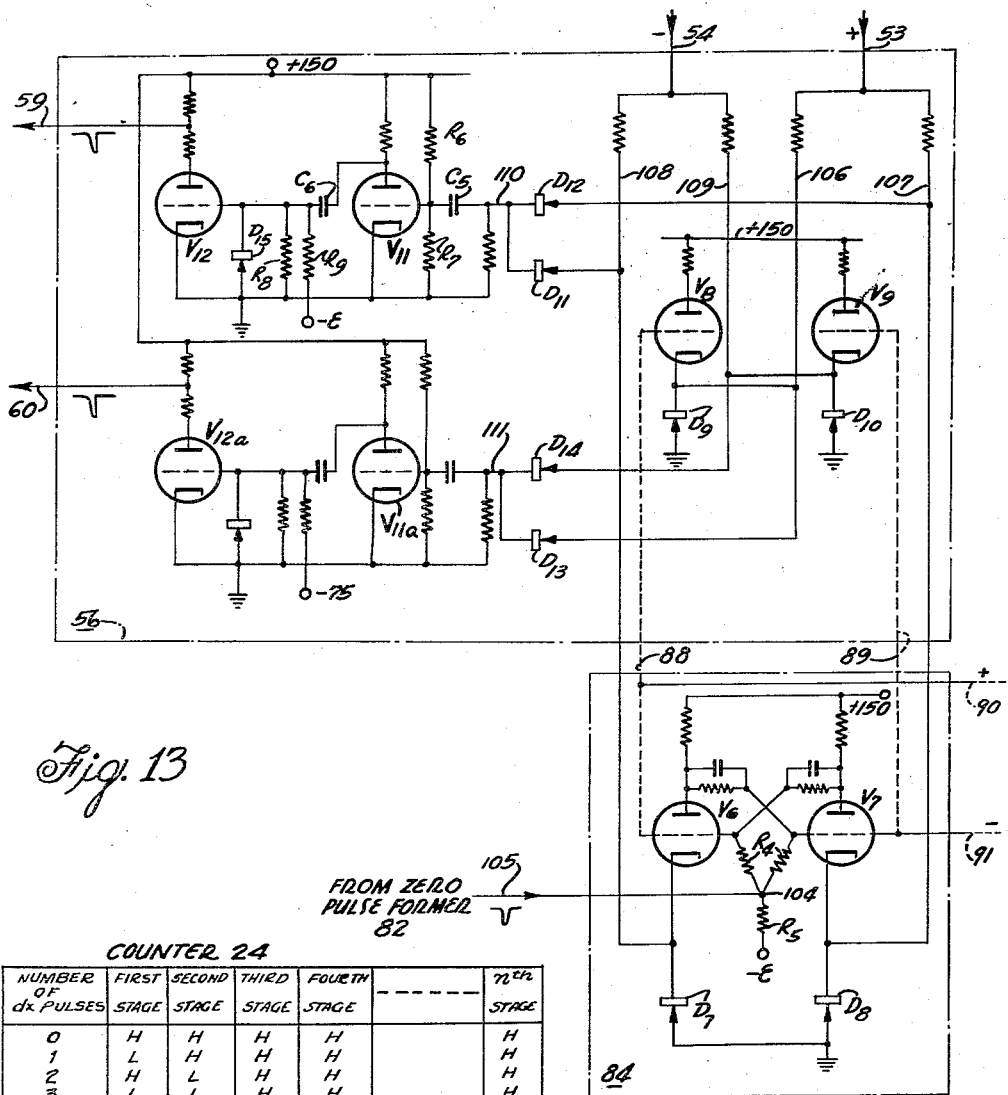
Figure 13 is a schematic wiring diagram of the sign $y$ flip flop and the sign $y-dy$ reversing switch.
Figure 19 is a graph illustrating the operation of certain components shown in Figures 4, 5 and 6.

In Figure 19, a chart is shown illustrating the operation of the counters 24. Since the X counters 24 are connected in cascade arrangement, the triggering of each stage is controlled by the operation of the previous stage. Before the introduction of any pulses, the left tubes in each of the stages are cut off. This is illustrated by the letter "H" in the chart shown in Figure 19 to indicate that a relatively high voltage is produced on the plate of the left tube in each stage. The left tube in each stage corresponds to the tube $V_0$ in the stage shown in Figure 7.

Upon the introduction of a first $dx$ pulse, the first stage in the X counter 24 is triggered so that the right tube becomes cut off and the left tube corresponding to the tube $V_0$ becomes conductive. When the left tube in the first stage becomes conductive, a relatively low voltage is produced on the plate of the tube, as indicated by the letter "L" for the stage. As will be disclosed in detail hereinafter, a signal passes through the stage in the Y gates 27 associated with the first stage in the counter 24 when the left tube in the associated stage of the Y counter 28 is conductive at the time that the left tube in the first stage of the X counter 24 becomes conductive.

The introduction of a second $dx$ pulse to the X counter 24 causes the left tube in the first stage of the counter to become cut off and the right tube in the stage to become conductive. The resultant negative pulse of voltage on the plate of the right tube in the first stage of the X counter 24 is introduced to the second stage of the counter to cut off the right tube in the second stage and to make the left tube in the stage conductive. When the left tube in the second stage of the X counter 24 becomes conductive, a signal passes through the associated stage of the Y gates 27 provided that the left tube of the associated stage in the Y counter 28 is also conductive. A signal does not pass through the stage in the Y gates 27 associated with the second stage in the X counter 24 when the left tube in the associated stage of the Y counter 28 is non-conductive at the time that the left tube in the second stage of the X counter 24 becomes conductive.

The left tube in the first stage of the X counter 24 again becomes conductive upon the introduction of a third $dx$ pulse. This causes a signal to pass through the first stage in the Y gates 27 provided that the left tube in the associated stage of the Y counter 28 is also conductive at this time. However, a signal does not pass through the second stage of the Y gates 27 upon the introduction of the third $dx$ pulse even though the left tube in the second stage of the X counter 24 and the left tube of the associated stage in the Y counter 28 are both simultaneously conductive. The reason for this is that a signal can pass through a stage of the Y gates 27 only when the left tube of the associated stage in the X counter 24 changes from a condition of non-conductivity to a condition of conductivity to produce a negative pulse on the plate of the tube.

The introduction of the fourth $dx$ pulse to the X counter 24 causes the right tube in the first stage of the counter to become conductive. The resultant negative pulse of voltage on the plate of the right tube in the first stage triggers the second stage into its alternate state of operation so that the right tube in the second stage becomes conductive. This in turn causes the third stage in the X counter 24 to become triggered so that the right tube in the third stage becomes cut off and the left tube becomes conductive. When the left tube in the third stage becomes conductive, a signal passes through the associated third stage in the Y gates 27 provided that the left tube of the associated stage in the Y counter 28 is also conductive at this time. If the left tube of the associated stage in the Y counter 28 is not conductive at this time, a signal does not pass through the third stage in the Y gates 27 when the left tube of the third stage in the X counter 24 becomes conductive.

It will be seen from the chart shown in Figure 19 that the stages in the X counter 24 are able to pass a signal through only one of the stages in the Y gates 27 upon the introduction of each $dx$ pulse. A signal is able to pass through one of the stages in the Y gates 27 upon the introduction of each $dx$ pulse provided that the associated stage in the Y counter 28 is in a proper state of operation. Signals are able to pass through each of the stages in the Y gates 27 a weighted number of times dependent upon the relative position of the stage in the gates. For example, the first stage in the Y gates 27 is able to open substantially twice as often as the second stage; the second stage is able to open substantially twice as often as the third stage; the third stage is able to open substantially twice as often as the fourth stage, etc. The stages are able to open in a particular pattern because of the cascade arrangement of the different stages in the X counter 24. However, similar results would be obtained if the stages were able to open in a random fashion having a weighted effect corresponding to that disclosed above.

When all of the stages in the X counter 24 have been triggered so that the left tube in each stage is conductive, the introduction of the next $dx$ pulse to the counter causes the left tube in each stage to become cut off. Since none of the stages in the X counter 24 has its left tube passing from a condition of non-conductivity to a condition of conductivity upon the introduction of this $dx$ pulse, none of the stages in the Y gates 27 is able to open even though the left tubes of stages in the Y counter 28 may be conductive. Thus, when $n$ stages are used in the X counter 24 and in the Y gates 27, various stages in the Y gates 27 are able to open only during $2^n-1$ times out of each $2^n$ $dx$ pulse.

A slight error may be produced during the one pulse when none of the stages in the Y gates 27 is able to pass a pulse. This error is quite small. For example, if 12 stages are used in the X counter 24 and in the Y gates 27 an error of approximately $$\frac{1}{2^{12}}$$

would be produced. This is equivalent to an error of approximately 0.02%.

It is apparent from the cases mentioned that, in general, $$dz' = \frac{y\,dx}{2^n}$$

Referring to Figure 4 the output pulses $dz'$ on gate output line 30 are seen to feed into two parallel $dz$ output lines 31 and 32. The $dz'$ pulses are fed out directly on $dz$ output line 32, but the $dz'$ pulses are fed through an R counter 33 before being fed out on the other $dz$ output line 31. For this case also, it should be noted that the R counter 33 has the same number of stages as the X counter 24 and the Y counter 28.

It is to be noted that in making use of integrators for solving problems that the output from one integrator is fed back into one of its own inputs or into the inputs of another integrator; the two $dz$ output lines 31 and 32 provide the pulse rates that must be fed into the $dy$ inputs and the $dx$ inputs, respectively.

It should be made clear that since the present embodiment of the integrator is employing the series additive transfer method; the $dx$ pulse rate must be relatively high. For example, in order to transfer once the $y$ number existing in a Y counter having $n$ stages, $2^n$ $dx$ pulses must be fed into the integrator. Thus it can be appreciated that the $dz'$ pulses appearing on gate output line 30 cannot be fed into both the $dx$ and $dy$ inputs, but that the R counter, functioning as a rate divider, must reduce the rate of $dz'$ pulses $\frac{1}{2^n}$ for feeding in on $dy$ inputs.

Thus it is seen that a digital integrating circuit has been described which uses a serial additive transfer method for transferring the $y$ number into the Y counter, i. e., transfers the $y$ number from the Y counter one stage at a time.

Figure 5:
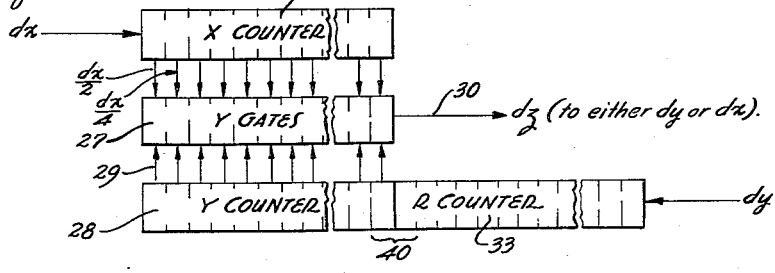
Figure 5 is the preferred arrangement of the modified embodiment in Figure 4.

Referring next to Figure 5, a slight modification of the circuit in Figure 4 is provided. It is shown there that the R counter 33 has been shifted from the $dz$ output line 31 (Figure 4) and placed in the $dy$ input line to the integrator. Thus the advantage of this set-up is made obvious. Only one $dz$ output pulse line is now required. The $dz$ pulse rate is now automatically available as the high rate needed for $dx$ inputs; and this same $dz$ pulse rate can now be used as the $dy$ inputs, the necessary rate division needed for the latter input being now made by the R counter 33 which will henceforth be called the first half of the Y counter 40.

By comparing the theory of operation of the general integrating circuit shown in Figure 2 with the embodiment shown in Figure 5, it is now apparent that whereas in Figure 2 the remainder accumulator 20 was used for holding the roundoff portion of the increment $dz$, the embodiment in Figure 5 can be thought of as using the R counter for holding the roundoff portion of the increment $dy_e$ which is the notation given to the carry pulse from the R counter 33 to the Y counter 28. This point of view will be more clearly revealed in the ensuing discussion.

This completes the description of the fundamental general circuits needed for performing digital integration and one particular modification which employs the serial additive transfer method.

Up to now no mention has been made of the fourth requirement as previously set forth for a digital integrating circuit. To meet this fourth requirement, the integrator must be able to attach a sign to the "ones" which it produces, that is, it must be able to produce either plus or minus "ones." Further, it must be able to utilize signed inputs.

Specifically:

(a) The Y counter must be able to contain either positive or negative values of $y$, hence, an indicator must be provided for the sign of $y$.

(b) The Y counter must receive a plus "one" in such a manner as to increase by unity in the least significant place the value of $y$ if its sign is positive, or decrease it similarly if the sign is negative. The reverse condition must hold if a minus "one" is received.

(c) The sign of the output must be made negative if the sign of $y$ is negative and the sign of $dx$ is positive.

(d) The sign of the output, including that effected by condition (c) must be reversed if the sign of a "one" presented on the "dx" input is negative.

In comparing the problem of sign in the digital integrator with the wheel-and-disc integrator, the following analogy is profitable.

The rate of occurrence of "ones" is analogous to the rate of rotation of a shaft. The sign of the "ones" effectively corresponds to the direction of rotation. The $dx$ input has its counterpart in the lead screw 17 drive; and the $dz$ output corresponds to the output shaft 11 which the wheel 10 drives.

The Y counter 28 plays the same role as the lead screw 17, a zero value of the Y counter corresponds to a centering of the wheel 10 upon the disc 13, while the two signs which $y$ may take indicate the direction of excursion of the wheel 10 from the center C of the disc 13.

The simplest mathematical way of handling a $y$ function which increases and decreases is to make the Y counter add and subtract. If a positive polarity pulse is made to indicate a positive $dy$ increment and a negative polarity pulse is made to indicate a negative $dy$ increment, the Y counter should add when positive polarity pulses are received and subtract when negative polarity pulses are received.

However, positive and negative values of $y$, and increasing and decreasing increments $dy$ of the variable $y$ are handled in a special manner in the present embodiment of the invention. Actually, the digital integrator circuit contains a Y counter which adds only. When a change in sign from + to − occurs in the $dy$ pulses, the number $y$ in the Y counter is changed to its complement. The treatment of the detailed logic of this operation will be fully explained later, but the net result is equivalent to subtraction in the digital integrator if a complementary set of Y gates is used.

Generalizing further, when the Y counter passes through zero a pulse is transmitted to a $y$ sign indicating flip-flop, the sign of the $dx$ pulses is remembered by another flip-flop. The sign of the $dz$ output pulses is controlled by the positions of these two flip-flops. By using a control circuit, when $dx$ and $y$ have like signs, $dz$ pulses are made positive and when $dx$ and $y$ have unlike signs, the $dz$ pulses are made negative. The position of a third flip-flop keeps track of the adding, subtracting-complementary functions.

Figure 6:
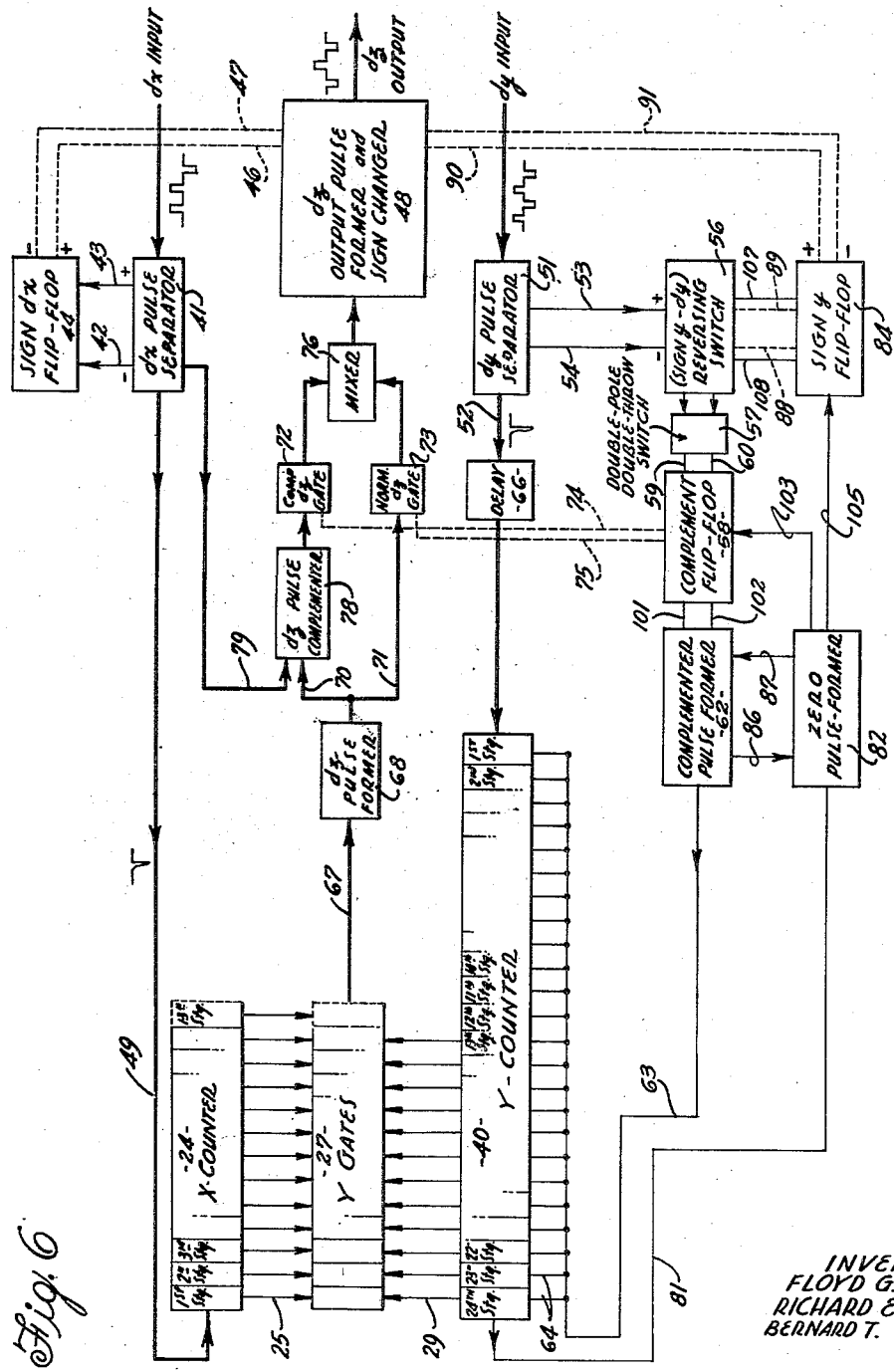
Figure 6 is a schematic illustration of the complete digital integrating circuit including the circuits for enabling the variables to assume values defined as positive or negative in sign.

A complete logical block diagram of a digital integrator, utilizing the serial additive transfer method and employing means for handling the signs of the variables, appears in Figure 6. The heavy solid lines on the diagrams indicate the main course taken by the pulses corresponding to the "ones" of the system and the dashed lines are control voltage lines.

The X counter is herein designated 24 and the Y gates 27, as before. The Y counter which was previously described as having twice the number of stages as the X counter 24 is labelled 40. These components have the preferred general arrangement, as just described, for providing serial transfer of the $y$ member from the Y counter 40.

For this embodiment, the X counter 24 actually has 13 binary stages (the 13th stage is shown dashed), which are each connected to 13 individual Y gates 27. The Y counter 40 has 24 binary stages. However, as before explained, not all of these Y stages are connected to the Y gates but only its last 12 stages. This leaves one of the Y gates connected to the 13th stage of the X counter 24 but not connected to the 12th stage of the Y counter below it. The reason for this 13th stage in the X counter will be explained later.

Before continuing the description of the functions of the remaining blocks in Figure 6, the serial additive transfer method will be further described.

Figure 7:
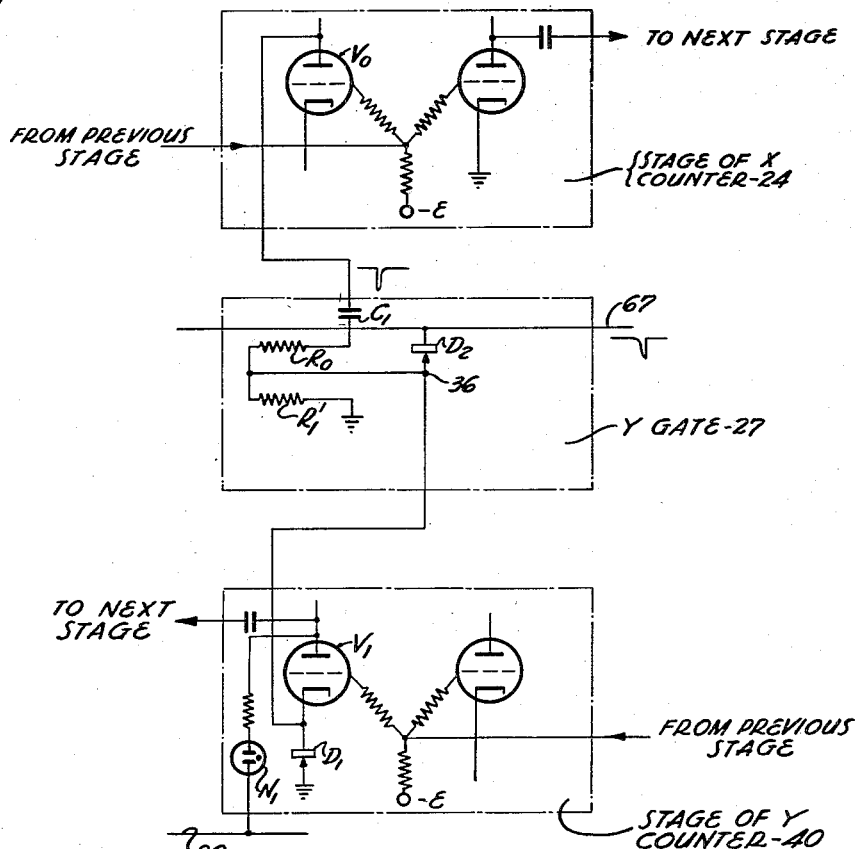
Figure 7 is a wiring diagram, partly fragmentary, of a typical stage of the X counter and Y counter; and a Y gate.

In Figure 7 a fragmentary detailed circuit diagram is shown of a typical stage of the X counter 24 and the Y counter 40. A full circuit diagram is shown of the associated Y gates 27. As the binary stages used in the counters are conventional and well known as Potter flip-flop circuits, only the pertinent portions of the circuits have been shown.

Here it is seen that the plate of the non-carry tube $V_0$ of the X counter stage is connected through a series capacitor $C_1$ and resistor $R_0$ to a gate junction 36 of a Y gate circuit 27. Gate junction 36 is connected to ground through a resistor $R_1'$. This gate junction 36 has two other connections. One of these connections joins junction 36 directly to the cathode of a carry tube $V_1$ in the Y stage directly below. The cathode of carry tube $V_1$ is grounded through a first diode $D_1$. The other connection joins gate junction 36 through a second diode $D_2$ to a common gate output line 67.

In the normal operation of the stage of the X counter 24 shown in Figure 7, the left tube, designated $V_0$, in the stage is cut off and the right tube is conducting. Upon the introduction of a negative pulse from the previous stage of the X counter 24 to the grids of the two tubes in the stage shown in Figure 7, the right tube in the stage becomes cut off and the tube $V_0$ starts to conduct. The flow of current through the tube $V_0$ causes a relatively low voltage to be produced on the plate of the tube. This voltage is introduced through the capacitance $C_1$ and the resistance $R_0$ to the junction 36 and the cathode of the tube $V_1$ in the stage of the counter 40 shown in Figure 7.

When the tube $V_1$ is conducting, it operates effectively as part of a cathode follower circuit in which the diode $D_1$ serves as the cathode impedance. Because of the impedance provided by the diode $D_1$, an increase in the current through the tube $V_1$ and the diode $D_1$ produces an increase in voltage across the diode.

Upon the introduction of a negative voltage to the cathode of the tube $V_1$, the voltage between the plate and the cathode of the tube $V_1$ increases. When the tube $V_1$ is conducting, the increase in voltage across the tube causes the current through the tube and the diode $D_1$ to increase and in turn to produce an increase in voltage across the diode. The increase in voltage across the diode $D_1$ serves to counteract the decrease in voltage produced on the cathode of the tube $V_1$ by the negative pulse from the tube $V_0$. As a result of this counterbalance, the voltage on the cathode of the tube $V_1$ remains substantially constant. Since the cathode of the tube $V_1$ is connected to the junction 36 and to the cathode of the diode $D_2$, the voltage on the cathode of the diode $D_2$ remains substantially constant during the time that the tube $V_1$ is conducting. This prevents any pulse from appearing on the output line 67.

When the tube $V_1$ is not conducting, the cathode follower circuit formed by the tube $V_1$ and the diode $D_1$ does not operate to counteract any negative pulse that may appear at the junction 36. As a result, the negative pulse is introduced to the cathode of the diode $D_2$ and is applied as an output pulse on the line 67.

On the basis of the above, an output pulse appears on the line 67 only when the tube $V_0$ becomes conductive at the time that the tube $V_1$ is non-conductive. This corresponds to a condition where the stages of the X counter 24 and the Y counter 40 shown in Figure 7 simultaneously provide positive indications of pulses in the stages.

Since the various stages in the Y gates 27 are prepared for opening on a weighted basis as disclosed above, the signals from the associated stages in the Y counter 28 are able to pass through the gates on a correspondingly weighted basis. For example, the signals in the stage of the Y counter 28 representing the binary digit of most significance are able to pass through the gates 27 substantially twice as often as the signals in the stage of the Y counter representing the binary digit of second most important significance. This results from the fact that the stage in the Y counter 40 representing the binary digit of most importance is associated with the stage in the X counter 24 representing the binary digit of least importance and every other stage in the Y counter is associated with the complementary stage in the X counter. In this way, the signals passing through the Y gates over a period of time corresponding to $2^n$ $dx$ pulses represent the total value of the $ydx$ increments for the period.

The X counter can be considered as a rate division anti-coincidence device for the $dx$ pulses. Since the pulses appearing on the common gate output line 67 must all be temporally spaced so as to be recognizable as distinct pulses, the binary counter method of distributing the $dx$ pulses ensures that the stages of the Y counter 40 are cycled in time so that no other anti-coincidence devices are needed in the circuit.

The stages in the X counter 24 can be considered in other ways than as rate divisors for the $dx$ pulses. For example, these stages can also be considered as activating means for preparing the various stages in the Y gates 27 on a weighted basis for opening. Because of the operation of the X counter 24 and the Y gates 27 in providing for the passage of the signal indications in the various stages of the Y counter 28 on a weighted basis, the X counter 24 and the Y gates 27 can be considered as a transfer device when used in combination with the Y counter 28. This transfer device would be equivalent to the transfer device 22 shown in Figure 2 and disclosed above. The transfer device controls the transfer or passage of signal indications from the integrand storage 18 to the remainder accumulator 20 in Figure 2. The Y counter 28 in Figure 4 operates as one type of integrand storage corresponding to the storage 18 in Figure 2 and the R counter 33 in Figure 4 operates as one type of remainder accumulator corresponding to the accumulator 20 in Figure 2.

The serial additive transfer method, used in the embodiment of the digital integrator in Figure 6, can be more clearly described by reference to Figure 8. As in Figure 3, integration is here described as the process of finding the area under a curve $y=f(x)$. For this specific case, as before, the heights of the rectangular sub-areas $A_n$ change in fixed increments of the ordinate designated in this case as $dy_e$, corresponding to changes of "one" in the first stage of the left hand half of Y counter 40 which is the stage numbered as 13th. The widths, on the other hand, of the sub-areas $A_n$ for this case, vary; these widths being determined by the plurality of discrete incremental changes $dx$, which occur during a change in $y$ of $dy_e$.

Figure 8:
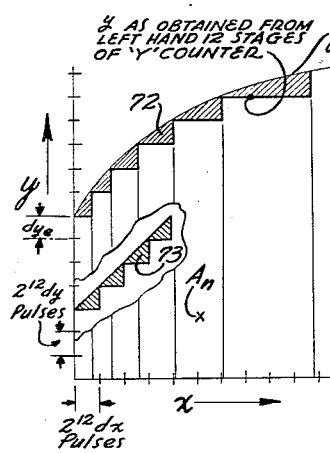
Figure 8 is a graph illustrating as example of how the preferred embodiment of the digital integrator performs the process of integration.

In Figure 8, an example is shown where the input rate of $dy$ pulses is greater than the input rate of $dx$ pulses. For approximately two-thirds of the first $2^{12}$ $dx$ pulses, the $y$ ordinate remains fixed; then the $y$ ordinate is suddenly considered to increase an amount equivalent to $dy_e$. This occurs when a carry pulse is fed from the first half of the Y counter, i. e., from the 12th stage to the 13th stage. Hence, an effective $dy$ increment $dy_e$ of the $y$ variable is equivalent to $2^{12}$ $dy$ pulses. As pulses corresponding to the value of $y$ are conveyed to the $dz$ common output line in accordance with the $dx$ pulses, the sum of the $dz$ output pulses thus obtained corresponds to the value of the area under the curve $y=f(x)$.

It is seen by referring to Figure 8 that the integration of the area under the curve $f(x)$ is in error by the cross-hatched portion 72 between the curve $f(x)$ and the step curve as obtained by using the $y$ ordinate as generated from the left hand 12 stages of the Y counter 40. This error is approximately corrected by use of the 13th stage of the X counter 24 and is known as the trapezoidal correction. Every time $2^{12}$ $dx$ pulses are received in the X counter a carry pulse is transmitted to its 13th stage. This 13th stage has its non-carry tube connected to the 13th Y gate 27 which is always in an open condition. Thus, every other $2^{12}$ $dx$ pulse passes through the 13th Y gate and is fed to the output as a $dz$ pulse. This pulse corresponds to an area $2^{12}$ $dy$ pulses by $2^{12}$ $dx$ pulses which when divided over two $dx$ transfer cycles adds an area equivalent to the trapezoidal correction shown as the cross-hatched area 73 in Figure 8. This trapezoidal correction is seen to be too large for slopes greater than 45° and too small for slopes smaller than 45°. However, on the average, the accuracy thus obtained is greater than actually transferring the full content of the Y counter during each $dx$ transfer cycle of $2^{24}$ pulses.

It should be noted that the series additive transfer method of performing integration does not give an incorrect result if the X counter and the Y gates, in the preferred embodiment of the integrating circuit, is made to have the same number of stages as the Y counter. The accuracy, in fact, may be slightly improved if this is done for certain functions, especially those which have a $y$ variable which remains relatively constant. The main consideration for having 13 stages, instead of 24, in the Y counter and the Y gates is to obtain the highest accuracy possible for the least amount of equipment and space.

Referring back to the general block diagram of the digital integrator in Figure 6, the remaining circuits, therein, provide means for handling positive and negative incremental pulses of the variables. The function of these latter circuits will first be described generally.

As positive and negative polarity pulses are to correspond to positive and negative increment "ones" of the system, both these polarity pulses are fed into the $dx$ pulse separator 41. In this circuit the negative $dx$ pulses are sent on negative $dx$ line 42 to one grid of a sign $dx$ flip-flop 44. The positive $dx$ pulses are first converted to negative polarity pulses and are then sent on positive $dx$ line 43 to the other grid of sign $dx$ flip-flop 44. The sign of the $dx$ input pulses is thus recorded and remembered by the state of flip-flop 44 at all times. Positive and negative $dx$ control lines 46 and 47, respectively, properly reflect the sign of the $dx$ pulses into the $dz$ output pulse former and sign changing circuit 48.

The $dx$ pulse separator 41 sends both polarity $dx$ input pulses into the X counter 24 as negative polarity pulses on the same $dx$ input conductor 49.

As will be disclosed in detail hereafter, the output pulses produced on line 49 are similar to the pulses produced on a line 79 in that all of the pulses representing positive and negative $dx$ increments appear on the line as pulses of negative polarity. In this way, the $dx$ pulse separator 41 produces only three different types of output signals even though four output lines are shown.

A circuit for providing the same functions as the $dx$ pulse separator 41 is shown in Figure 254 of "Principles of Television Engineering," by Donald G. Fink (McGraw-Hill Book Company, Inc., first edition, 1940). In Figure 254 of Fink's book, signals of positive and negative polarity are introduced to the primary winding of a transformer shown at the left side of the figure. The signals of positive polarity are separated from the signals of negative polarity by the action of the 6H6 tube and the center-tapped secondary winding of the transformer. The positive signals travel to the top row of circuits in Figure 254 of the Fink textbook and the negative signals travel to the bottom row of circuits in the figure.

The signals introduced to the top row of circuits in the Fink textbook appear as output signals on the plate of the first 6F8G tube in the row. Similarly, the signals introduced to the bottom row of circuits in Figures 254 appear as output signals on either the plate of the 1851 tube or the first 6F8G tube in the row. The output signals from the top row are applied to the grid of the first 6F8G tube in the middle row and the output signals from the first 6F8G tube in the bottom row are applied to the plate of the first 6F8G tube in the middle row. The signals on the plate of the first 6F8G tube in the middle row are introduced to the grid of the second 6F8G tube in the row. The resultant signals on the plate of the second 6F8G tube in the row correspond to the signals produced on the output lines 49 and 79 of the $dx$ pulse separator 41 shown in Figure 6 of this application.

In a like manner, the positive and negative polarity $dy$ input pulses are fed into the $dy$ pulse separator 51 where the positive pulses are converted to negative pulses and both polarity pulses are then fed into the Y counter 40 on $dy$ input line 52 as negative pulses. The $dy$ pulse separator 51 can be constructed in a manner similar to the $dx$ pulse separator 41 and in accordance with the circuits shown in Figure 254 of "Principles of Television Engineering," by Fink.

Whereas before, the sign of the $dx$ pulses was directly reflected in the state of the associated sign $dx$ flip-flop 44, in the case of the $dy$ pulses, the positive and negative $dy$ pulses, after appearing as negative polarity pulses on positive and negative $dy$ lines 53 and 54, respectively, pass through an electronic reversing switch 56 and a mechanical reversing switch 57 before having their sign remembered as one of the states of a circuit called a complement flip-flop 58. This complement flip-flop 58 has two input lines designated as a complement grid line 59 and a normal grid line 60. Thus, in accordance with the setting of the electronic reversing switch 56 and the mechanical reversing switch 57, which determines how positive and negative $dy$ lines 53 and 54 are to be connected to the complementary and normal grid lines 59 and 60, the complement flip-flop 58 is switched from either state to the other. The switching of lines 59 and 60 will be seen to automatically occur every time the sign of the number $y$ changes.

For the purpose of explaining the operation of the digital integrating circuit, the mechanical reversing switch 57 will be assumed to be omitted for the present and its function will be explained later.

Each time the complement flip-flop 58 is switched a complement pulse forming circuit 62 is triggered which feeds a complementing pulse on a common line 63 having parallel connections 64 to each of the stages of the Y counter. This complementing pulse changes each of the Y stages to its opposite state, i. e., changes all the ones to zeros and vice versa.

The $dy$ input pulse which results in the complementing pulse that changes all the Y stages to its opposite state, has the additional role of changing the magnitude of $y$ by "one." Hence, the $dy$ pulse which caused the complement is delayed in a delay circuit 66 until the transients arising from the change in state of the Y counter have died down. This $dy$ pulse is then added to the complement number now existing in the Y counter which, in effect, changes the original $y$ by "one."

The $y$ number which is serially to be cycled onto the common gate output line 67 by the $dx$ input pulses can thus be seen to be either the $y$ number or its ones complement.

After passing through a $dz$ pulse forming circuit 68 in output line 67, the $dz$ pulses have two possible paths they can take, a normal path 71 or a complement path 70, before being fed to the $dz$ output pulse former and sign changer circuit 48.

Gates 72 and 73, in the complement path 70 and normal path 71 respectively, controlled by opposite states of the complement flip-flop 58, determine which of these paths the $dz$ pulses will follow.

This is accomplished by gate control lines 75 and 74 which connect the normal $dz$ gate 73 and complement $dz$ gate 72 to the normal and complement tubes respectively of the complement flip-flop 58.

Thus, if the $dz$ pulses from $dz$ pulse former 68 are due to the transfer of a normal $y$ number, the normal tube of the complement flip-flop 58, in a manner to be described, holds the normal $dz$ gate 73 open, and the complement tube of the flip-flop 58 holds the complement gate 72 closed. Thus, the $dz$ pulses pass through normal $dz$ gate 73 and through a mixer 76 to the $dz$ output pulse former and sign changer circuit 48. The mixer 76 may be constructed in accordance with the principles disclosed on pages 119 and 120 of "Electronics," by Elmore and Sands, Division V, volume 1, of National Nuclear Energy Series, published by McGraw-Hill Book Company, Inc.

If, on the other hand, the $dz$ pulses from $dz$ pulse former 68 are due to the transfer of a complemented $y$ number, the condition of the tubes of the complement flip-flop 58 is reversed for this case and the complement $dz$ gate 72 is now open. The $dz$ complementing pulses are now fed into a $dz$ pulse complementer circuit 78 located in the complement path 70. Simultaneously, the train of negative polarity $dx$ pulses, which are being fed into the X counter 24 are fed on a second $dx$ input conductor 79 into the $dz$ pulse complementer circuit 78. The function of this circuit, which is to be described in detail later, is to cancel one of the $dx$ pulses for each $dz$ complementing pulse fed therein. Obviously, the $dx$ pulses are equal to or of a higher rate than the $dz$ complementing pulses, thus the difference rate ($dx-dz$ comp.) is fed through the open complement $dz$ gate 72 and through the mixer 76 to the $dz$ output pulse former and sign changer circuit 48.

When the number $y$ in the Y counter 40 was complemented, the $dy$ pulses thereafter fed into the Y counter increased the complemented $y$ number. When, subsequently, the $dz$ complementing pulses derived by passing thru the $y$ gates with the Y counter in the complemented condition are matched against the stream of $dx$ input pulses, the remaining $dx$ pulses which become the $dz$ output pulses correspond to a pulse stream that would be formed by passing thru the $y$ gates controlled by a normal $y$ number decreased by the number of $dy$ input pulses fed into the Y counter, i. e., the effect of the total operation on the $dz$ output is equivalent to subtracting one pulse from $y$ for each $dy$ pulse as long as the complementing operation is in effect.

It may be noted that the reason the complemented $dz$ pulses can be matched against the $dx$ input pulses is because the number of $dx$ pulses, namely $2^{12}$, needed for scanning the Y counter once is equivalent to the total capacity of the last 12 stages of the Y counter which are connected through the Y gates to the first 12 stages of the X counter.

As noted in Figure 6, connected to the last stage (the 24th stage) of the Y counter is an overflow line 81 which leads to a zero pulse forming circuit 82. This circuit 82 creates a pulse when the Y counter 40 completely clears in passing through zero.

In order for the Y counter to pass through zero, the $y$ number therein must be decreasing, thus the complementing process, equivalent to the subtracting process, must be active. This operation, as has been described, is characterized by an increaing complement $y$ number in the Y counter. This means that when the true $y$ number reaches zero, its complement, held in the counter, will equal the counter capacity.

Thus it is shown that whenever the Y counter reaches capacity, it puts out a pulse, representing a pass through zero for the $y$ number, which triggers zero pulse former 82.

The pulse output from zero pulse former 82 triggers a sign $y$ flip-flop 84 to what is considered its minus state. It also triggers the complement flip-flop 58 to its normal position. The interconnections 86 and 87 between the complement pulse former 62 and the zero pulse former 82 are blocking connections. As will be later more clearly revealed by the detailed description of these circuits, these interconnections 86 and 87 prevent the occurrence of a zero pulse and a complement pulse at the wrong time.

The sign $y$ flip-flop 84 is connected by positive and negative $y$ lines 88 and 89 respectively to reverse the electronic reversing switch 56. Every time the sign $y$ flip-flop 84 is triggered, the connections from positive and negative $dy$ lines 53 and 54 to opposite grid lines 59, 60 of the complement flip-flop 58 are interchanged. Positive and negative $y$ control lines 90 and 91, respectively, convey the sign of $y$ to the $dz$ output pulse former and sign changer circuit 48 which, along with

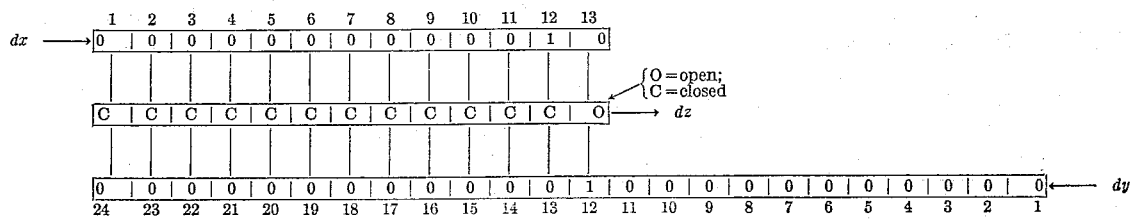

the sign of $dx$, enables the proper sign of the $dz$ output pulses to be determined.

This completes the description of the general block diagram of the digital integrator which satisfies all the requirements previously set forth as desirable.

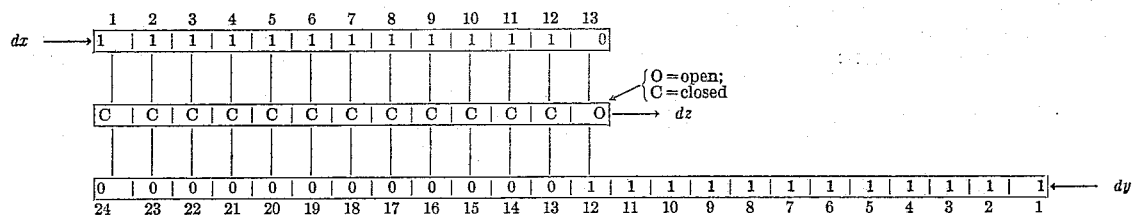

Any table of operation of the embodiment illustrated in Figure 6 would be arbitrary with respect to the $dx$ and the $dy$ inputs. This is obvious since, for example, a plot of $y$ versus $x$ in Figure 8 is a staircase function approximating a desired curve $y=f(x)$. Therefore, for simplicity's sake, consider the condition where $dy=dx$. Initial conditions will include zero number content in the $x$ and $y$ counters. After $2^{12}$ pulses have been applied to the two counters, they appear like this:

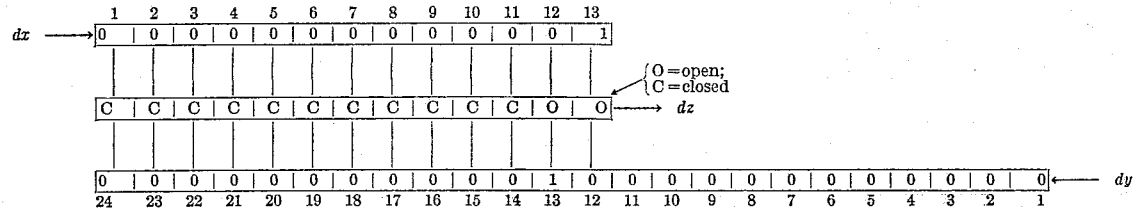

No output pulses will have been realized.
After $2^{13}-1$ pulse inputs, the counters appear so:

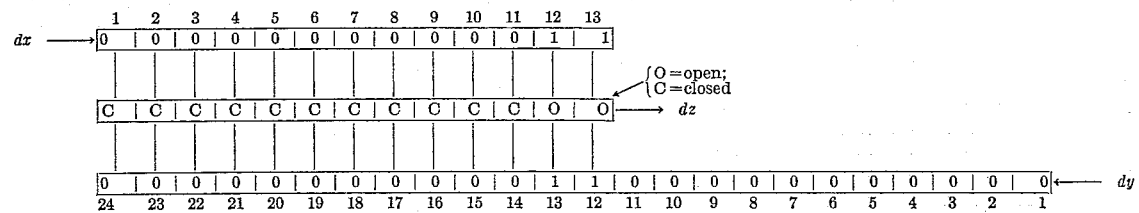

No output pulses have appeared at $dz$.
The $2^{13}$ input $dx$ pulse passes through the 13th Y gate and forms the first $dz$ output pulse:

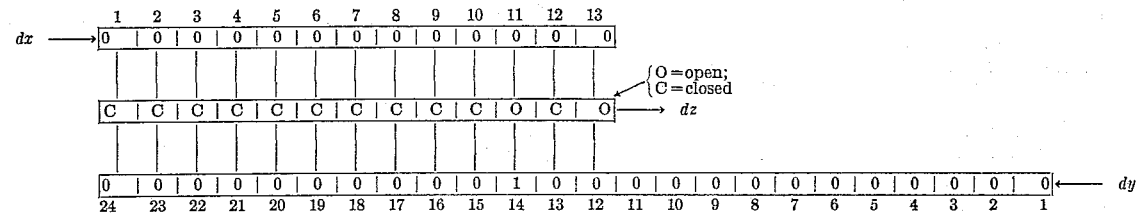

The $3 \times 2^{12}$th $dx$ input pulse passes through the open 12th Y gate to give the second $dz$ output pulse:

After $2^{14}$ input pulses have occurred, no additional $dz$ pulses appear beyond the two already effected:

The next $2^{12}$ input pulses will effect one $dz$ output pulse from the 11th stage of the X counter through the open Y gate:

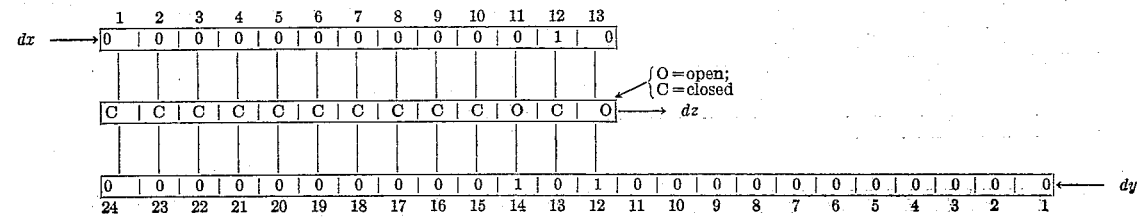

After the sixth set of $2^{12}$ input pulses have been applied, they produce two $dz$ output pulses, one through the open 14th Y gate and one through the open 12th Y gate, resulting in the following configuration:

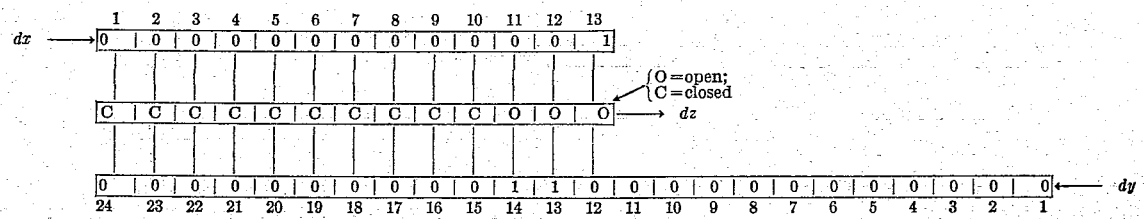

A seventh set of $2^{12}$ input pulses cause a $dz$ output pulse to appear through gates 14 and 13, thereby producing two $dz$ output pulses:

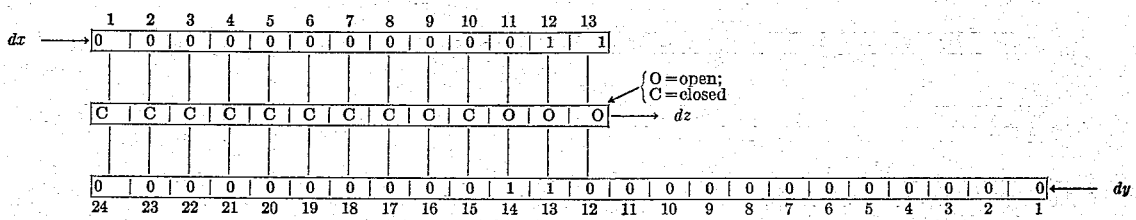

The eighth set of $2^{12}$ input pulses effects a single $dz$ output pulse through open gate 14:

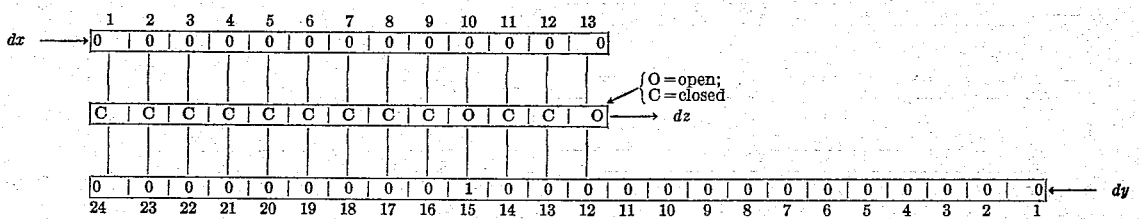

The ninth set of $2^{12}$ input pulses causes two $dz$ output pulses and a configuration of number content in the counters:

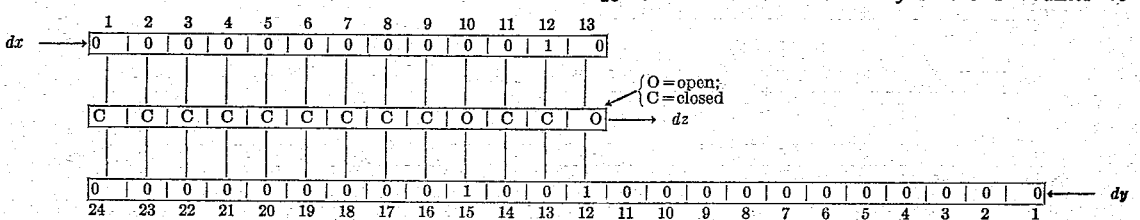

The tenth set of $2^{12}$ input pulses causes three $dz$ output pulses and a configuration of number content in the counters:

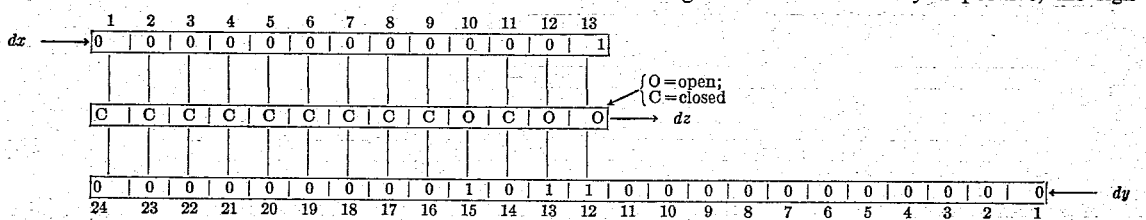

The eleventh set of $2^{12}$ input pulses causes three $dz$ output pulses and a configuration of number content in the counters:

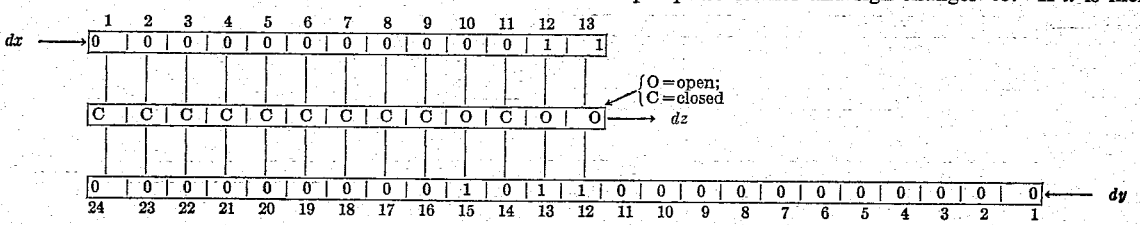

Assuming that the $y$ number for a particular problem to be solved on the digital integrator is to vary as a sine function, the operation of the sign circuits can now be described with reference to Figure 9.

The operation of the circuits with a change in sign of $dy$ as occurring in the vicinity of point $e$ of the graph of the variable $y$ in Figure 9 can be summarized as follows:

Assume first that the $y$ number in the Y counter is positive and increasing. For this condition, the sign $y$ flip-flop 84 is positive, and the complement flip-flop 58 is normal. The number $y$ in the Y counter 40 is thus in normal form and the $dz$ pulses are passing through the normal gate 73 to the $dz$ output pulse former and sign changer circuit 48. Since $y$ is positive, the sign of the $dz$ output pulses depends on the sign of the $dx$ input pulses, and is automatically determined by the $dz$ output pulse former and sign changer 48. If $x$ is increasing as in this example, the $dx$ input pulses and hence the $dz$ output pulses will be positive.

Figure 9:
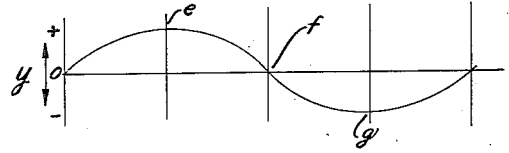
Figure 9 is a graph of the dependent variable $y$ illustrating the operation of the sign changing circuits.

As the calculation proceeds to point $e$ of the graph of Figure 9, the $dy$ input pulses are positive and they are being sent to the Y counter 40 whose positive number content is increasing. The positive $dy$ input pulses are also being sent through the positive $dy$ line 53, and straight through the electronic reversing switch 56 to the normal grid of the complement flip-flop 58, thus keeping flip-flop 58 in its normal condition.

Now when the change in sign of the increment $dy$ occurs as when proceeding beyond point $e$ of Figure 9, negative pulses arrive at the $dy$ input. The first of these (see Figure 6) goes through the negative $dy$ line 54 to the electronic reversing switch 56 and straight through to the complement grid line 59 of the complement flip-flop 58 which flips to its complement position. This action sends a complement pulse from complement pulse former 62 to the Y counter changing the $y$ number to its complement. (Actually, all ones are changed to zeros and vice versa.) At the same time the complement $dz$ gate 72 opens and the normal $dz$ gate 73 closes. The $dy$ pulse which caused all of this now comes into the Y counter increasing its content by one. Since the number $y$ is in complementary form, this is equivalent to subtracting one. This complementing operation continues all the while negative $dy$ pulses are fed into the integrator. The $dz$ pulses now pass through the complement gate as described before and into the output with positive sign since sign $y$ and sign $dx$ are still positive. The succeeding negative pulses into the $dy$ input keep adding to the complemented $y$ number in the Y counter which has the equivalent effect of decreasing the true value of $y$.

When the contents of the Y counter pass through zero decreasing, as depicted by point $f$ of the graph in Figure 9, the zero pulse from the Y counter causes the complement flip-flop 58 to be placed in its normal position again, and the negative number $y$ is represented in the Y counter by a normal number equal to the magnitude of $y$. The sign $y$ flip-flop 84 changes to negative and further negative $dy$ pulses are crossed through the electronic reversing switch 56 to the normal grid of the complement flip-flop 58 keeping it in its normal position. Finally, when $dy$ changes to positive again, with $y$ still negative, as shown at point $g$ of the graph of the variable $y$, the positive $dy$ pulses are sent to the complement grid tripping the complement flip-flop 58 to its complement position. The $y$ number is again changed to its complement form and the complement $dz$ gate 72 used.

Since, in differential analysis, it is the value of $y$, as shown in a Y counter, that is generally desired to be obtained, a means is provided for enabling the actual value of $y$ to be visually indicated by neon lights at all times, whether the integrating circuit is in its normal or complementing condition. In connection with Figure 7, a partial wiring diagram of a typical Y stage was previously described. There a neon bulb $N_1$ is shown to be connected from the plate to carry tube $V_1$ to a neon return bus 80.

When a normal number is contained in the Y counter 40, the neon bulbs, such as bulb $N_1$, light up when a digit "one" is in a stage; and are dark when a digit "zero" is in a stage. This gives a binary reading of the counter content.

When the integrator circuit is in the complemented condition, as required for decreasing the number content of the Y counter 40, the "ones" complement of the number content is set into the Y counter. Under these conditions, the states of the neon bulbs, such as bulb $N_1$, would likewise be changed such that the dark neon bulbs would have to be noted to determine the binary reading corresponding to the $y$ number.

Figure 10:
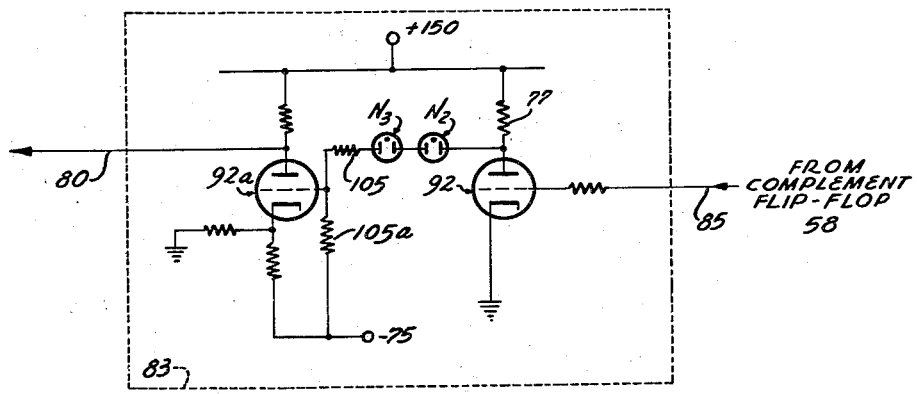
Figure 10 is a diagram of the neon return circuit which enables a continual visual indication to be made of the actual $y$ number in the Y counter.

Hence, the common neon return bus 80, to which each neon bulb of each Y stage is connected, is fed through a neon return circuit 83 shown in Figure 10. The function of neon return circuit 83 is to take a voltage sensed from the grid of tube $V_5$ (Figure 12) of complement flip-flop 58, amplify the change evidenced thereon due to the two states of the flip-flop, and thus supply the proper voltage level required for causing the neon bulbs to be fired so as to directly indicate the binary content of the Y counter regardless of its operating condition.

The grid of tube $V_5$, of complement flip-flop 58, is either, for example, at $-22$ volts or 0 volts, depending on whether the integrating circuit is in its normal or complementing condition, respectively.

When the grid of tube $V_5$ is at $-22$ volts (normal condition), this low voltage level is conveyed on a line 85 to the grid of a partially conducting first tube 92, in neon return circuit 83, causing it to be non-conducting. The plate of triode 92 thus experiences a rise in potential due to disappearance of a voltage drop across plate load resistor 77. The output line from the plate of triode 92 is returned to a negative bias through two series neons $N_2$ and $N_3$, and two series resistors 105 and 105$a$. The two neons $N_2$ and $N_3$ have a fixed voltage drop across their terminals. For the condition when the plate of triode 92 is high, the potential drop across neons $N_2$ and $N_3$, together with the drop in potential due to series resistor 105, causes the grid of second triode 92$a$, which is connected thereto, to be sufficiently high to cause second triode 92$a$ to conduct. Thus the plate output voltage from second triode 92$a$, which is impressed in neon return bus 80, is at a low potential. The neons, such as $N_1$, from each of the Y stages is thus returned to a low voltage and fire when their respective stages are in a "one" state.

When the integrating circuit is in its complement condition, it is desired that the neon return bus 80 be impressed by a high potential so that the neons, such as $N_1$, will fire when their respective stages are in a "zero" state.

For this latter condition, the 0 voltage, the relatively high voltage level from flip-flop 58, is conveyed on line 85 to triode 92, causing it to conduct. The resulting low potential on the plate of triode 92 when diminished by the fixed potential drops across the terminals of neons $N_2$ and $N_3$, and the drop across series resistor 105, causes the second triode 92$a$ to be effectively cut-off. Thus the resulting plate voltage of triode 92$a$, when impressed on neon return bus 80, causes the neons, such as neon $N_1$, to be fired when their respective stages are in a zero state.

It is thus seen that the indicating neons, visually indicate at all times the true $y$ number existing in the Y counter.

Referring next to Figure 11, a schematic circuit diagram, partly detailed, is shown of the $dz$ pulse complementing circuit 78. The function of this circuit is to match the $dz$ pulses, resulting from transferring a complemented $y$ number, against the $dx$ input pulses emitted from $dx$ pulse separator 41. Both these pulses are initially of a negative polarity.

The negative $dx$ pulses are fed into circuit 78 on second $dx$ input conductor 79. These pulses are first inverted and amplified in an R.-L. peaker 93. The positive polarity pulses thus obtained are used to trigger a one-shot multivibrator 94 whose output is a positive voltage square wave of a time length determined by its RC time constant. The square wave is then differentiated in a differentiating circuit 95 before applied to the control grid of a triode tube $V_2$. Tube $V_2$ is normally conducting. Thus the positive peaked pulse, due to differentiating the square wave, has no effect on the tube $V_2$; but each negative peaked pulse resulting from the differentiation, cuts off the tube $V_2$. This circuit thus provides a means for delaying the $dx$ pulses before they are applied on the grid of tube $V_2$.

Connected in parallel with tube $V_2$ is a second triode $V_3$. The cathodes and plates, respectively, of tubes $V_2$ and $V_3$ are joined together to form what will be described as a blocking network.

The negative voltage $dz$ pulses from pulse former 68 are fed as a second input into the $dz$ pulse complementing circuit 78 on complementing path 70. These pulses are first fed through a phase inverter 96. Positive polarity pulses are thus made available for triggering a second one-shot multivibrator 97. In this case, the square wave formed is applied directly to the grid of the second tube $V_3$. The charcteristics of tube $V_3$ is such that it is normally biased below cut-off and becomes conducting only when its grid becomes positive due to the applied square wave.

The plates of tubes $V_2$ and $V_3$ are connected through a common load resistor $R_1$ to the positive supply. A plate output line 98 is taken from a point on the resistor $R_1$ relatively near its positive end.

The line 98 is normally at a potential less positive than the source due to the drop through the upper part of resistance $R_1$. Any instant, however, that neither tube $V_2$ or $V_3$ conducts, line 98 is momentarily at the potential of the source and a positive pulse is fed out thereon.

If no wide pulses caused by $dz$ pulses are applied on the grid of tube $V_3$, tube $V_3$ never conducts. Thus each time a $dx$ pulse is received on normally conducting tube $V_2$, the negative pulse due to differentiating circuit 95 cuts off tube $V_2$; and with both tubes now off, this action is sensed on the output plate line 98 as a positive output pulse.

Now then, assume that $dz$ complementing pulses are fed in on complement path 70, these pulses occur at substantially the same instant as the $dx$ pulses. Thus, each $dz$ complementing pulse prevents a $dx$ pulse from being sensed on plate output line 98 by causing tube $V_3$ to conduct for the instant that tube $V_2$ does not conduct.

By delaying the $dx$ pulses before applying them on the control grid of tube $V_2$; and, by broadening the $dz$ complementing pulses in second one-shot multivibrator 97 before applying them on the control grid of tube $V_3$, variations in delays of $dx$ pulses passing through the $x$ counter and Y gates are accounted for so that coincidence of pulses on tubes $V_2$ and $V_3$ is assured.

The positive output pulses obtained on plate line 98 represent the difference between the $dx$ pulses and the $dz$ complementing pulses and these pulses are sent through the complement $dz$ gate 72 after being inverted in a second phase inverter 99.

Figure 12 is a schematic wiring diagram of the complement flip-flop 58 together with the normal $dz$ gate 73 and the complement $dz$ gate 72.

It was previously noted that positive and negative $dy$ input pulses are separated and fed as negative pulses on separate lines, either straight through the reversing switch 56 or crossed therein, to the normal grid line 60 and the complement grid line 59 leading to the complement flip-flop 58.

The grid lines 59 and 60 connect, respectively, through capacitors $C_2$ and $C_3$ to the grids of triodes $V_4$ and $V_5$. Triodes $V_4$ and $V_5$ are connected to form a two-stable state circuit which, as before noted, is known as a Potter flip-flop circuit. The intercoupling networks between plates and grids maintain the two stable states.

Thus a negative pulse arriving at the flip-flop on either grid lines 59 or 60 cuts off the respective tube and causes the other tube to conduct. If a tube is already non-conducting, a negative pulse on its grid has no effect on the state of the flip-flop.

The tube $V_5$ is designated the normal tube, and the tube $V_4$ is designated the complement tube. The circuit is operative in the condition corresponding to the non-conducting tube of the flip-flop.

The cathodes of each of the tubes $V_4$ and $V_5$ is noted to be connected through normal and complementary diodes $D_3$ and $D_4$ respectively to ground.

These diodes $D_3$ and $D_4$ are connected so that electrons can pass from ground through the tubes $V_4$ and $V_5$.

The cathodes of tubes $V_4$ and $V_5$ are also connected through gate control lines 74 and 75, respectively, to the complement $dz$ gate 72 and the normal $dz$ gate 73.

Refer next to the complement $dz$ gate circuit 72, which is the only one which will be described since the normal $dz$ gate circuit 73 is identical to it. Complement gate control line 74 is connected to a junction S in the gate circuit 72. Complement path 70 feeds $dz$ pulses through a series capacitor $C_4$ and a series resistor $R_2$ to the junction S. A complement gate output line 100 feeds the output from junction S to mixer 76. The junction S is also grounded through a resistor $R_3$. In order to understand the operation of the gate circuits, it should be understood that these circuits actually include the triodes $V_4$ and $V_5$. The $dz$ gates 72 and 73 are thus seen to be similar to the Y gates 27 previously described.

In operation, the capability of a negative pulse on complement path 70 to be sensed on the complement gate output line 100 depends on the conducting or non-conducting condition of the tube $V_4$. This results from the fact that the tube $V_4$ effectively forms a cathode follower circuit with the diode $D_3$, which serves as the cathode impedance in the cathode follower circuit. During the time that the tube $V_4$ is conducting, negative pulses of voltage introduced to the cathode of the tube cause the current through the tube to increase in a manner similar to that disclosed above for the tube $V_1$ (Figure 7). Since the increase in current through the tube $V_4$ produces a corresponding increase in voltage across the diode $D_3$, the negative pulse of voltage passing through the line 70 is substantially counterbalanced.

During the time that the tube $V_4$ is not conducting, the tube $V_4$ and the diode $D_3$ cannot operate by changes in current to counteract the effects of any negative pulses applied to the cathode of the tube. In this way, pulses of negative voltage appearing in the line 70 are applied by the gate 72 to the output line 100.

Thus it is evident that the ability of the complement $dz$ gate 72, or the normal $dz$ gate 73, to pass a pulse depends on the state of the complement flip-flop 58. A pulse passes through the complement gate 72 when the electron tube $V_4$ conducts.

The diodes $D_5$ and $D_6$ of the complement flip-flop circuit 58 illustrates the clamping technique employed for preventing overshooting of the grid potential when the flip-flop tubes are switched. This overshoot of the negative drop is caused by the coupling of the large negative swing of the opposite plate through its coupling capacitor to the cutoff grid. The voltage returns to a normal level as this capacity discharges through a fairly high resistance.

Diodes $D_5$ and $D_6$ "clamp" the grids at $-E$, preventing the undesirable overshoot, by discharging the coupling condensers very fast through the low forward resistances of the diodes $D_5$ and $D_6$.

Every time the complement flip-flop 58 changes state, an output pulse is needed for triggering the complementer pulse former 62. Therefore, output conductors 101 and 102 are taken from the plates of each of the tubes $V_4$ and $V_5$ respectively.

In addition to supplying the voltage level on line 85 for the neon return circuit 83, as previously described in connection with Figure 10, one other connection is needed for the complement flip-flop circuit 58. Every time the sign of the $y$ number changes, the operation of the circuits must change from a complement to a normal condition. Therefore, a path 103, from zero pulse former circuit 82, is connected to the grid of $V_5$ of the complement flip-flop 58, for enabling the negative polarity zero indicating pulse to trigger the flip-flop 58 into its normal state.

The details of the sign $y$ flip-flop 84 and the (sign $y-dy$) electronic reversing switch 56 shown in Figure 13 will next be described.

The sign $y$ flip-flop 84 is also a Potter two-stable state circuit comprised in this case of two intercoupled triode tubes designated as $V_6$ and $V_7$. When tube $V_6$ is conducting, the flip-flop is considered to be in a negative state, i. e., the sign of $y$ is minus. When tube $V_7$ conducts, the sign of $y$ is plus.

The indication of a $y$ number going through zero or changing its sign is given when the Y counter 40 has a carry-out pulse on overflow line 81. As has been explained, this carry-out pulse triggers a zero pulse forming circuit 82 which emits a negative polarity zero pulse. This zero pulse is impressed on sign $y$ flip-flop 84 at a point 104 which connects to the grids of both tubes $V_6$ and $V_7$ through individual resistors $R_4$. Point 104 is further connected through a bias resistor $R_5$ to a negative potential —E.

Flip-flop 84 is triggered from whichever state it is in to the other state every time a negative pulse is fed in at point 104.

The two states of the flip-flop 84 are sensed by positive and negative $y$ control lines 90 and 91 which are connected to the grids of tubes $V_6$ and $V_7$ respectively. The sign state of the tube of the flip-flop is evidenced by a low voltage on the corresponding control line 90, 91.

As noted, $dy$ input pulses are fed into the digital integrator circuit on a single wire carrying pulses of either or both polarities. These two pulses polarities are then separated in the $dy$ pulse separator 51 and fed as negative polarity pulses on two channels, the positive and negative $dy$ lines 53 and 54.

It is desired to connect the two lines 53 and 54 either directly, or crossed, to the complement grid line 59 and the normal grid line 60 of the complement flip-flop 58. The reason for this is due to the fact that, for example, when the $y$ number in the Y counter is positive, positive $dy$ increment pulses add to the existing $y$ number and "normal" operation of the circuits is employed. However, when the $y$ number in the Y counter is negative, positive $dy$ increment pulses subtract from the existing $y$ number and "complementing" operation of the circuits is used.

Thus, electronic reversing switch 56 is provided for enabling this switching of connections to be automatically made each time the sign $y$ flip-flop 84 associated with it is triggered. In this switch circuit: when the sign $y$ flip-flop 84 is in the state with tube $V_6$ non-conducting and tube $V_7$ conducting, i. e., $y$ is positive, positive $dy$ line 53 is interconnected to the normal grid line 60 and the negative $dy$ line 54 is interconnected to the complement grid line 59; when the sign $y$ flip-flop is in its opposite state, i. e., $y$ is negative, the above lines are crossed.

To accomplish this, the grids of the sign $y$ flip-flip tubes $V_6$ and $V_7$ are connected to the grids of driven tubes $V_8$ and $V_9$, in the electronic reversing switch 56, by positive and negative $y$ lines 88 and 89 respectively.

The tubes $V_6$ and $V_8$, therefore, conduct simultaneously, while tubes $V_7$ and $V_9$ are non-conducting, and, vice versa.

For each of the tubes $V_6$, $V_7$, $V_8$, $V_9$, a diode gate $D_7$, $D_8$, $D_9$ and $D_{10}$ respectively, is used for connecting the cathodes of the tubes to ground.

It will be remembered that in describing the complement $dz$ gate 72 and the Y gate 27, it was shown that if a tube is drawing current through a diode which connects the cathode of the tube to ground, the tube and diode serve as components in a cathode follower circuit. For example, in Figure 7, the tube $V_1$ and the diode $D_1$ operate as part of a cathode follower circuit. When the tube $V_1$ is conducting, a negative pulse introduced to its cathode from the plate of the tube $V_0$ is counterbalanced by the operation of the tube $V_1$ and the diode $D_1$ so that no pulse appears at the junction 36.

Referring to the top of Figure 13, positive $dy$ line 53 is seen to divide into parallel positive wires 106 and 107. One of these positive wires 107 connects to the cathode of tube $V_7$ in the sign $y$ flip-flop, the other positive wire 106 connects to the cathode of driven tube $V_8$.

In a like manner, negative $dy$ line 54 is seen to divide into parallel negative wires 108 and 109. In this case, negative wire 108 connects to the cathode of tube $V_6$ and negative wire 109 connects to the cathode of tube $V_9$.

The tube $V_9$ and the diode $D_{10}$ operate as part of a cathode follower circuit in a manner similar to that disclosed above for the tube $V_1$ and the diode $D_1$ shown in Figure 7. When the tube $V_9$ is conducting, it operates with the diode $D_{10}$ to counterbalance any negative pulse introduced to its cathode through the line 54 and the line 109. Because of this counterbalancing operation, no pulse is introduced to the diode $D_{14}$.

The negative pulse introduced through the line 54 to the cathode of the tube $V_9$ is also introduced to the cathode of the tube $V_6$. During the time that the tube $V_9$ is conducting, the tube $V_6$ is not conducting. Since the tube $V_6$ is non-conductive, it cannot operate to counterbalance the effects of any negative pulse introduced to its cathode. As a result, the negative pulse passing through the line 54 is applied through the line 108 to the diode $D_{11}$.

Similarly, when a negative pulse is introduced through the line 53 and the tube $V_7$ is conducting, the tube $V_7$ and the diode $D_8$ operate to prevent the pulse from being introduced to the diode $D_{12}$. Since the tube $V_8$ is cut off at the same time that the tube $V_7$ is conducting, the negative pulse in the line 53 is applied through the line 106 to the diode $D_{13}$.

When the flip-flop 84 is triggered again, tubes $V_7$ and $V_9$ now become non-conducting and tubes $V_6$ and $V_8$ become conducting. Input pulses on lines 54 and 53 now obviously are reversed i. e., pulses on line 54 find their way to output channel 111 and pulses on line 53 find their way to output channel 110.

In the electronic reversing switch circuit 56, diodes $D_{11}$ through $D_{14}$ are used to prevent a pulse from being damped by a low impedance at the output channels 110 and 111. For example, suppose a pulse on negative $dy$ input line 54 is not dissipated through diode $D_7$ and reaches output channel 110 through diode $D_{11}$; without $D_{12}$ this negative pulse would be shunted by the low impedance of diode $D_8$ which is drawing current for the connecting tube $V_7$.

The negative pulses appearing in output channels 110 (Figure 13) and 111 are applied through limiting networks to the complementary grid line 59 (Figures 12 and 13) and the normal grid line 60, respectively. The limiting network associated with the channel 110 includes tubes $V_{11}$ and $V_{12}$ (Figure 13), and the limiting network associated with the channel 111 includes tubes $V_{11a}$ and $V_{12a}$.

Referring to channel 110, pulses thereon are fed through a capacitor $C_5$ onto the grid of the normally conducting tube $V_{11}$. The grid of tube $V_{11}$ is so biased, by fixed potentiometer resistors $R_6$ and $R_7$ across the power supply, so that positive pulses which might be caused by transients or changes in states of the previous switching circuits are effectively eliminated. However, negative pulses appearing on channel 110 cut off tube $V_{11}$ to enable positive pulses to be fed from its plate.

The tube $V_{12}$ has its grid coupled by a coupling capacitor $C_6$ to the plate of tube $V_{11}$. This latter grid is normally held at a fixed cut-off voltage by the resistor $R_8$ connected to the cathode of tube $V_{12}$, which is grounded; and a connection to negative source —E, through a bias resistor $R_9$. The diode $D_{15}$ aids the grid of $V_{12}$ in limiting the positive pulse appearing on the grid of tube $V_{12}$ to a fixed magnitude and thus enables the negative output pulse from the plate of tube $V_{12}$, fed on complement grid line 59, to be of a fixed magnitude.

A similar limiting network is associated with output channel 111 and thus controls the magnitude of the negative pulses appearing on normal grid line 60. The output impedances of $V_{12}$ and $V_{12a}$ are very low allowing a mechanical reversing switch 57 as shown in Figure 6 to be inserted without detrimental effects of distributed capacity.

When interconnecting several integrators for solving complex problems, it is often necessary to take the $dz$ output pulses from one integrator and reverse their sign before feeding them as $dy$ inputs into another integrator. Therefore, as shown in Figure 6, the two output lines from electronic reversing switch 56 are connected to the normal grid line 60 and the complement grid line 59 through a mechanical reversing switch 57. As the signs the interconnected variables must have are determined during initial preparation of a problem, the mechanical reversing switch 57 is set, as needed, along with other initial conditions, prior to starting the computation. Reversing this switch effectively reverses the sign of the input $dy$ pulses.

Figure 14:
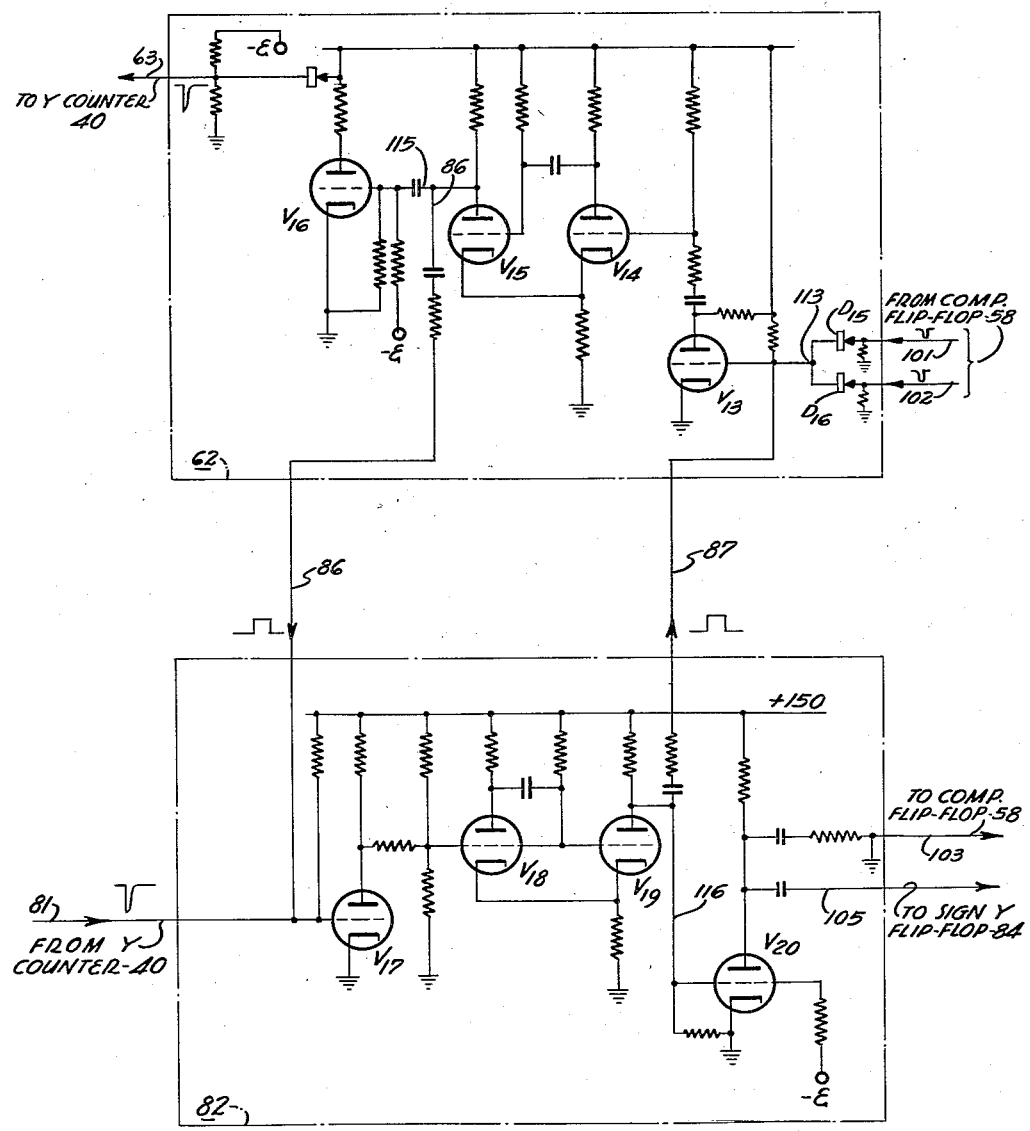
Figure 14 is a schematic wiring diagram of the complement pulse former and the zero pulse former circuits.

As next shown in Figure 14, the output from the complement flip-flop 58 is fed on either ouput conductor 101 or 102 into the complementer pulse former 62 which circuit is next to be described. A negative pulse on conductors 101 or 102 is fed to a common input junction 113 through buffer diodes $D_{15}$ and $D_{16}$ respectively. This junction 113 feeds into the grid of a tube $V_{13}$. The positive output pulse from the plate of tube $V_{13}$ which has thus been momentarily cut off, is then fed into a one-shot multivibrator circuit, made up of tube $V_{14}$ and $V_{15}$, where the pulse is broadened and fed on two paths 115 and 86. In path 115, the positive pulse is inverted in tube $V_{16}$ and fed out on complementing line 63 to simultaneously trigger each of the stages of the Y counter 40 to put it in its complement condition.

Path 86, which was previously designated as a blocking line, connects the broad positive pulse to the carry line 81 feeding into the zero pulse forming circuit 82.

Whenever the Y counter 40 is complemented, a carry pulse may be emitted from the last stage of the Y counter depending on the condition of its flip-flop. As it is only desirable to have a carry pulse trigger the zero pulse forming circuit 82 when the $y$ number in the Y counter passes through zero, as in ordinary counting, the broad positive pulse on blocking line 86 nullifies any negative pulse on carry line 81 due to complementing the $y$ number in the Y counter 40.

Referring next to the zero pulse forming circuit 82 in the lower part of Figure 14, a zero pulse on carry line 81 during ordinary counting operations, i. e. when no pulse appears on blocking line 86, is enabled to cut off tube $V_{17}$ which thus inverts the negative zero pulse and feeds it into a one-shot multivibrator comprised of triode tubes $V_{18}$ and $V_{19}$.

As before, the positive broad pulse output from the one-shot multivibrator of circuit 82 is fed out on two lines, a second blocking line 87 and a flip-flop line 116 which is connected to the grid of an inverter tube $V_{20}$. The plate of tube $V_{20}$ feeds negative pulses on separate channels to trigger the complement flip-flop 58 on path 103 and the sign $y$ flip-flop 84 on path 105.

The sign $y$ flip-flop 84 thus changes state to record a change in sign of the $y$ number and in doing so switches electronic reversing switch 56 to cross the $dy$ input pulse therein as previously explained.

The complement flip-flop 58 which is also triggered from a complement condition to a normal condition at the same instant thus opens normal gate 73 and closes complementary gate 72.

It is to be noted, however, that after the Y counter passes through zero, it is desired that the operation change from a complementing process to a normal process only as far as gates 72 and 73 are concerned. Thus, the $y$ number content of the Y counter is not to be complemented again before being fed to the $dz$ output circuit 48. Hence, when complement flip-flop 58 is triggered by a zero pulse from zero pulse former 82, a broad pulse is simultaneously emitted from zero pulse former 82 on second blocking line 87. This broad positive pulse nullifies the negative pulse emitted on output line 101 or 102 from complement flip-flop 58 and prevents the negative pulse from triggering the complement pulse former 62 and consequently complementing the Y counter.

The $dz$ pulse forming and sign changing circuit 48 in Figure 15 is next to be described.

The $dz$ pulses passed through both the normal $dz$ gate 73 and the complement dz gate 72 are fed through mixer 76 and are then sent into the $dz$ output circuit 48 as negative polarity pulses.

The main function of the $dz$ output circuit 48 is to give a sign to each $dz$ output pulse fed into it. This sign being evidenced by giving a negative polarity to minus $dz$ pulse and a positive polarity to plus $dz$ pulses. The sign of these $dz$ pulses is algebraically determined by the signs of the $dx$ pulses and the $y$ pulses which were multiplied so to say, to produce the $dz$ pulses.

The negative $dz$ pulses from mixer 76 (Figure 6) are first fed on the grid of an inverter tube $V_{21}$. The output from tube $V_{21}$ is then impressed upon a diode clamping circuit 116 similar to the one described in connection with the electronic reversing switch 56.

The fixed magnitude positive pulse thus obtained is then impressed upon the grid of $V_{22}$. From the plate of tube $V_{22}$ a negative pulse is fed onto the grids of $V_{23}$ and $V_{28}$. The output from the tube $V_{23}$ is fed as a positive pulse on parallel output wires 117 and 118. Each of these wires 117 and 118 connect to one diode of an upper and lower set of diodes 119 and 120.

Each of the control lines 46 and 47 from the sign $dx$ flip-flop is connected through inverting tubes $V_{24}$ and $V_{25}$ respectively to a second diode in each of the upper and lower set of diodes 119 and 120, respectively.

Likewise, each of the control lines 90 and 91 from the sign $y$ flip-flop is connected through inverting tubes $V_{26}$ and $V_{27}$ to the remaining diode in the upper and lower set of diodes 119 and 120 respectively.

Thus, it is seen that the positive lines from the sign $dx$ flip-flop 44 and the sign $y$ flip-flop 84 are fed into the upper set of diodes 119 and the negative lines from these flip-flops are fed into the lower set of diodes 120.

In order to understand the function of the sets of diodes 119 and 120 and the remaining components of this circuit, the general logical method of circuit design which was utilized for obtaining the circuit will be described. This method utilizes the correspondence between propositions and methods of symbolic logic, and the two valued nature of electrical quantities in impulse work.

In general, when a voltage has two possible values, high or low, it resembles a proposition of symbolic logic which has two possible values, true and false, or zero and one. The operations by logic such as addition, multiplication, and negation may be accomplished as will be shown by means of diodes or vacuum tube circuits.

Logical representation of a proposition may be made using the symbol 1 for a true proposition or a high voltage and 0 for a false proposition or a low voltage. For example, addition may be defined logically by the following table:

| | | |
|---|---|---|
| 1+1=1 | | H+H=H |
| 1+0=1 | or in terms of high | H+L=H |
| 0+1=1 | and low voltages | L+H=H |
| 0+0=0 | | L+L=L | and multiplication by the following table:

```
1×1=1       H×H=H
1×0=0  or   H×L=L
0×1=0       L×H=L
0×0=0       L×L=L
```

Negation may be represented by a prime symbol and is defined as follows:

```
1'=0   or   H'=L
0'=1        L'=H
```

The above tables for symbolic addition and multiplication can be similarly extended to apply to three input propositions. For this case, in symbolic addition, a low voltage output is sensed when, and only when, all three inputs are low; and in symbolic multiplication a high voltage output is sensed when, and only when, all three inputs are high.

Before showing how the above operations can be accomplished physically by means of diodes or vacuum tube circuits, the set-up of the particular problem of designing the $dz$ pulse former and sign changer circuit 48, using the above techniques, will be introduced. The function of the sign changing part of circuit 48 is to switch a pulse input into one of two output channels depending on the condition of two flip-flops. If the flip-flops are in the same condition the pulse is transmitted in one channel, and if different in a second channel.

Figure 16:
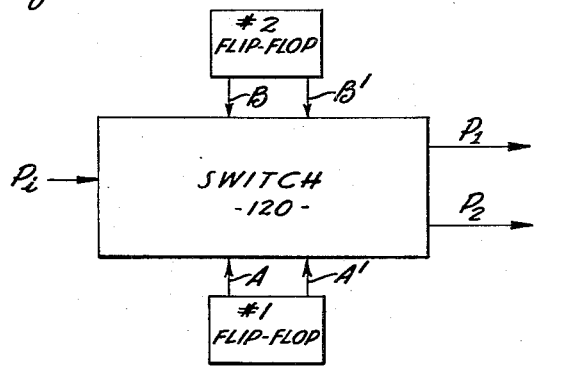
Figure 16 is a block diagram for illustrating the symbolic logic set-up of a portion of the circuit in Fig. 14.

A block diagram of this portion of the circuit 48 will be first presented and described in Figure 16. This diagram includes a switch 120 controlled by two flip-flops #1 and #2.

As a flip-flop inherently contains two propositions simultaneously, these are represented as A and A' for flip-flop #1; and, B and B' for flip-flop #2. The four voltage propositions A, A', B and B' are obtained from the two flip-flops by connecting either to their two plates or their two grid voltages.

The input pulse $P_i$ to switch 120 may be regarded as a proposition which is true during the occurrence of a positive input pulse. The same reasoning holds for the output pulses $P_1$ and $P_2$ from the switch 120. The first step in the design is to construct the "truth" table desired between output and inputs. For example, a pulse on output channel $P_1$ is desired only when an input pulse occurs with A and B true, or A and B false. The truth table with 1's and 0's is written for all cases as shown below.

| A | B | $P_i$ | $P_1$ | $P_2$ |
|---|---|---|---|---|
| 0 | 0 | 0 | 0 | 0 |
| 0 | 0 | 1 | 1 | 0 |
| 0 | 1 | 0 | 0 | 0 |
| 0 | 1 | 1 | 0 | 1 |
| 1 | 0 | 0 | 0 | 0 |
| 1 | 0 | 1 | 0 | 1 |
| 1 | 1 | 0 | 0 | 0 |
| 1 | 1 | 1 | 1 | 0 |

The symbolic relation between $P_1$ and the inputs may be expressed by writing down the cases for which $P_1$ is one and logically adding:

$$P_1 = P_i A'B' + P_i AB$$

since logical factoring is permissible $$P_1 = P_i(A'B' + AB)$$

Similarly, the symbolic relation between $P_2$ and the inputs may be expressed as follows:

$$P_2 = P_i AB' + P_i A'B$$
$$P_2 = P_i(AB' + A'B)$$

From symbolic logical algebra it can be shown that:

$$AB' + A'B = (AB + A'B')'$$

therefore:

$$P_2 = P_i(AB + A'B')'$$

It can also be shown by logical operations that if $$P_2 = P_i(AB + A'B')'$$

and $$P_1 = P_i(AB + A'B')$$

then, $$P_2 = P_i P_1'$$

The necessary electronic circuits to produce the logical terms, $$P_1 = P_i(AB + A'B')$$

and $$P_2 = P_i P_1'$$

to fill in the block labelled switch in Figure 16 may now be readily constructed as shown in Figure 15. The $P_i$ input of Figure 16 corresponds to the output from the plate of tube $V_{23}$ in circuit 48. This latter plate voltage is high (or true) only during an input $dz$ pulse from mixer 76. The inputs from the flip-flops #1 and #2 in Figure 16, of course, correspond to the inputs in circuit 48 from the sign $dx$ and sign $y$ flip-flops.

Therefore, in circuit 48, the term $P_i AB$ is formed by multiplication of the three terms fed on separate lines to the upper set 119 of diodes. To perform this multiplication, the plate ends of the three diodes in set 119 are joined together at a top junction 122. This top junction 122 is then connected through a resistor $R_{11}$ to the high potential source. The top output line 125 from top junction 122 is at the high potential of the positive source only when all three input lines thereto are of a high potential. If any one or more of the three input lines is of a low potential, top junction 122 is relatively low in potential because of diode current flowing through resistor $R_{11}$. This output voltage corresponds to a logical product of the three input voltages as defined previously.

Similarly, $P_i A'B'$ is formed by multiplication of the respective terms sensed as positive pulses in the lower set 120 of diodes. The plate end of these diodes is joined to form a bottom junction 123 which is also connected to the high potential source through a resistor $R_{12}$. In order for bottom output line 126 to have a high potential thereon, all three of the input lines to the lower set of diodes 120 must be of a high potential.

The two terms $(P_i AB)$ and $(P_i A'B')$ thus formed are added together by feeding the positive pulses corresponding to them into a third set of diodes 127. The cathodes of the two diodes in the third set of diodes 127 are joined at a point 128, and for this case, also joined through a resistor $R_{13}$ to a low positive voltage determined by resistor bleeder network 125a. In this latter set of diodes the output voltage from point 128 is relatively low, i. e. at the low voltage determined by resistor network 125a only when top and bottom output lines 125 and 126 are both relatively low. Thus, means have been provided for symbolically adding two terms, as defined previously.

If either output line 125 or 126 is relatively high, point 128 is relatively high (with respect to the resistor network 125a voltage) because of diode current passing through resistor $R_{13}$.

Thus, a circuit for obtaining the term $P_1$ has been designed. $P_1$ is recognized at point 128 as a positive pulse, inasmuch as one of the inputs $P_i$, which corresponds to the $dz$ positive output pulse from tube $V_{23}$, is in the nature of a pulse.

In order to form the second output $P_2$ equal to $P_i P_1'$, $P_1'$ is fed from the grid of tube $V_{23}$ to the grid of a first vacuum tube $V_{28}$ in a circuit called a vacuum tube multiplier.

For every negative pulse $P_1'$ in the grid of tube $V_{28}$, the tube will cut off, or at least have it current carrying capacity decreased, thereby causing a rise in potential in line 131 to form a positive pulse. However, when a positive pulse from point 128 (corresponding to a true condition for $P_1$) is applied to the grid of tube $V_{29}$, which is normally biased to cut-off by the —75 volt grid input, it causes tube $V_{29}$ to conduct, thereby causing a drop in voltage line 131. When a negative pulse $P_1'$ is applied to the grid of tube $V_{28}$ and a negative voltage is on the grid of tube $V_{29}$ from point 128, the output from $V_{28}$ and $V_{29}$ on line 131 will be a relatively high voltage.

$P_1$, as obtained from point 128, is fed on a line 130 to the grid of a second tube $V_{29}$ associated with first tube $V_{28}$. Terms $P_1'$ and $P_1$ are inverted, i. e., negated in the vacuum tubes $V_{28}$ and $V_{29}$ and thus appear on their plates of $P_1$ and $P_1'$. The plates of tubes $V_{28}$ and $V_{29}$ are joined together and have a common load resistor $R_{14}$.

The common plate output line 131 of the tubes $V_{28}$ and $V_{29}$ is at the high potential of the positive sources only when both their grid lines carrying $P_1'$ and $P_1$ are low. By writing a truth table this situation can be shown to satisfy $$P_iP_1=P_z$$

Thus, a circuit for obtaining the second output $P_2$ has been designed and is evidenced as a positive pulse on common plate output line 131.

The operation of the tubes $V_{28}$ and $V_{29}$ as an "and" network in Figure 15 to produce an output pulse for the logical equation $P_2=P_iP_1'$ may be seen from several examples. In one example, $P_1$ is false when $dx$ is positive and $y$ is negative. In this example, the tube $V_{26}$ remains conductive and causes a negative voltage to be introduced to its associated diode in the network 119. Because of the low voltage on the cathode of the diode associated with the tube $V_{26}$ in the network 119, current flows from the source of positive voltage through the resistance $R_{11}$ and the diode and produces a relatively low voltage at the junction 122. This relatively low voltage is introduced to the plate of the diode 127 in the line 125 to prevent current from flowing through the diode, the line 125 and the resistance $R_{13}$ to ground.

Similarly, the tube $V_{25}$ remains conductive when $dx$ is positive. This causes a relatively low voltage to be introduced from the plate of the tube $V_{25}$ to the cathode of the associated diode in the network 120. The resultant flow of current through the resistance $R_{12}$ and the diode produces a relatively low voltage at the junction 123 and prevents current from flowing through the line 126, the diode 127 in the line, and the resistance $R_{13}$.

Since current cannot flow through the resistance $R_{13}$ when $dx$ is positive and $y$ is negative, a relatively low voltage is introduced to the grid of the tube $V_{29}$. This low voltage prevents the tube $V_{29}$ from conducting. Upon the simultaneous introduction of a negative pulse to the grid of the tube $V_{28}$ to indicate a finite variation $dz'$, the tube $V_{28}$ also becomes cut off. By simultaneously cutting off the tubes $V_{28}$ and $V_{29}$, current is prevented from flowing through the resistance $R_{14}$. This causes the voltages on the plates of the tubes $V_{28}$ and $V_{29}$ to rise to a value approximating the voltage from the positive source. The rise of voltage on the plates of the tubes $V_{28}$ and $V_{29}$ produces a positive pulse in the line 131.

Similarly, a positive pulse is produced in the line 131 when a $dz'$ pulse is introduced from the mixer 76 at the time that $dx$ is negative and $y$ is positive. When $dx$ is negative and $y$ is positive, the tubes $V_{24}$ and $V_{27}$ are conductive. This causes a relatively low voltage to be produced on the cathodes of the diodes associated with the tubes $V_{24}$ and $V_{27}$ in the networks 119 and 120, respectively, so that current flows through the resistances $R_{11}$ and $R_{12}$ and the diodes. The flow of current through the resistances $R_{11}$ and $R_{12}$ in turn causes the voltages at the junctions 122 and 123 to be relatively low and prevents current from flowing through the resistance $R_{13}$. Since current cannot flow through the resistance $R_{13}$, voltage at the junction 128 is relatively low. As a result, the tube $V_{29}$ is cut off at the same time that the tube $V_{28}$ is cut off by the introduction of a negative pulse representing a $dz'$ output from the mixer 76.

A positive pulse is not produced on the output line 131 during the times that a pulse is not introduced from the mixer 76. A positive pulse is not produced on the output line 131 during such times, since the tube $V_{28}$ remains conductive and causes current to flow through the resistance $R_{14}$. When the tube $V_{28}$ remains conductive, it prevents a postive pulse of voltage from being produced in the output line 131 even though $dx$ and $y$ should simultaneously be positive or should simultaneously be negative.

Thus positive pulses at point 128 and on common plate output line 131, corresponding to the first output $P_1$ and the second output $P_2$, are fed into one-shot multivibrator circuits designated as 132 and 133 respectively. The positive pulse from point 128, corresponding to $P_1$, is fed through a voltage divider comprising resistors $R_{14a}$ and $R_{15}$ prior to being fed into the one-shot multivibrator 132. The voltage divider is used for attenuating the pulse to the desired level for triggering the multivibrator 132. The pulse from multivibrator 132 is then differentiated in capacitor $C_8$. The positive peaked pulse thus obtained is used to trigger a tank circuit comprised of capacitor $C_9$ and inductance $L_2$. The diode $D_{18}$ permits only the positive portion of the first wave to pass to grid line line 131a of a normally cut-off tube $V_{30}$.

Return now to the common plate output line 131 on which positive pulses corresponding to $P_2$ are generated. These pulses similarly pass through a voltage divider to one-shot multivibrator 133 and are then differentiated, as before, to energize a tank circuit composed of capacitor $C_{10}$ and inductance $L_3$. The tank circuit is, in this case, biased by a resistor $R_{15}$ connected to ground and another resistor $R_{15a}$ connected to a negative bias of —75 v. As before, a diode $D_{19}$ enables the positive wave only of the tank circuit to be fed onto a second grid line 132a. In order to further prevent spurious positive pulses from passing to second line grid 132a and for fixing the base line of the pulses, a series diode $D_{20}$, having its cathode slightly negatively biased, is placed in second grid line 132a.

Second grid line 132a feeds into the grid of a class A amplifier tube $V_{31}$. Tube $V_{31}$ is thus normally conducting a small amount. The cathode of this latter tube and tube $V_{30}$ have their cathodes connected through a common cathode resistor $R_{11}$ to ground.

It should be noted here that positive pulses at point 128, corresponding to $P_1$, and positive pulses on common plate line 131, corresponding to $P_2$, necessarily always occur at different times. The fuction of amplifier tube $V_{31}$ is to pass these pulses to its output as positive and negative polarity pulses.

When a positive wave arrives at the grid of tube $V_{30}$ to cause it to conduct, the current drawn through common cathode resistor $R_{11}$ makes the voltage on the cathode of tube $V_{31}$ more positive and cuts off tube $V_{31}$. The series plate inductance $L_4$ and plate resistance $R_{16}$ serve to peak the resulting positive pulse on output line 134.

On the other hand, when a positive wave arrives at the grid of tube $V_{31}$, the current drawn through tube $V_{31}$ is increased and the resulting negative drop on its plate is similarly peaked and fed onto output line 134.

It is thus seen that $dz$ pulses from mixer 76 have been properly tagged with their sign in accordance with the signs of the $y$ number and the $dx$ pulses remembered in their respective sign flip-flops. The pulses corresponding to $P_1$ have been passed with positive polarity and are thus considered to have a plus sign, while the $P_2$ pulses have been passed with a negative polarity and are thus considered to have a minus sign. In other words, the pulses on 134 are positive when sign $dx$ and sign $y$ are alike and negative when they are different which satisfies the equations of signs in the integrator.

In order to provide a low impedance output, these two polarity pulses on output line 134 are passed through a cathode follower $V_{32}$ to the $dz$ output line 133a of the integrator where the pulses are then fed to its own inputs or the inputs of other integrators in accordance with the problem to be solved.

This completes the description of the details of a preferred embodiment of a fundamental digital integrating circuit which can be used for obtaining solutions to any type of differential equation or for generating functions of time which are solutions of differential equation.

The basic method of solving, for example, ordinary differential equations by the use of these integrating circuits is to interconnect the components of one or a plurality of them so as to create a feed-back system; and then "drive" the entire system by pulses generated at a fixed rate in an external pulse generator. The pulses from the pulse generator are known as the independent variable, $x$, of the equations. Somewhere in the system a line will carry pulses representing the dependent variable, $y$, of the equation. This $y$ pulse stream, usually representing the solution desired, is integrated and recorded in a separate output unit, or one of the components of the circuit. Simultaneously with the recording of $y$, the $x$ pulses are summed and recorded, for example, on an X pulse totalizer counter. By reading the values of $y$ corresponding to values of $x$ at desired intervals, the solution to the problem is obtained.

The manner of interconnecting the integrating circuits is determined by the differential equations to be solved, i. e., for each particular problem the interconnection system is arranged in a particular way. The general theory of this is well known to the differential analyzer art.

As an example of a problem that can be solved using these circuits, the hook-up and mode of operation for simultaneously generating the sine and cosine functions will be described. As is well known, these trigonometric functions can be expressed as the solutions to the simple harmonic differential equation $$\frac{d^2y}{dx^2} = -y$$

In considering the application of the digital integrating circuit it is noted that two integrations are required to obtain the solution to this equation: the first integration gives, $$\frac{dy}{dx} = \int -y\,dx$$

and the second integration gives, $$y = \int \frac{dy}{dx}\,dx$$

From calculus $$\frac{dy}{dx} = 0$$

when $y$ is a maximum or minimum. Hence, the initial conditions of this problem may be taken as:

at $x=0$, $y=y_{max.}$, $\frac{dy}{dx}=0$

In order to physically generate the above integrations, two embodiments of the circuits shown in Figure 6 will be utilized in the system hookup. This hookup is schematically illustrated in a block diagram in Figure 17. The only components designated in the schematics of the two integrator circuits, A and B, are the X counter, the Y counter, and the Y gates; as these identify the two input and the single output conductors associated with each integrator. These components are distinguished in integrator circuits A and B by appropriate subscripts. The sign control circuits, although not shown, are assumed to be included and the setting of the mechanical reversing switches 57, which must be set as one of the initial adjustments, is identified by a legend in the upper right hand corner of each integrating block. In addition to the two integrating circuits, a 30 kc. pulse generator 138 and an X totalizer counter 139, are included in the block diagram of Figure 17. The X totalizer counter 139 is connected directly to pulse generator 138 and has a large enough capacity, for example, to record the total number of $x$ pulses emitted during a computation.

In general, to determine how to interconnect the integrator circuits to obtain the feed-back network, two pulse sources are considered. One of these sources constitutes the independent variable $x$ pulses generated in the external pulse generator 138. The other of these sources is an assumed source generating $$\frac{d^n y}{dx^n}$$

pulses, where $$\frac{d^n y}{dx^n}$$

is the highest derivative in the equation, in this case, $$\frac{d^2 y}{dx^2}$$

All the terms of the differential equation are generated from the $x$ source and the assumed source. A final feed-back connection is then made from the output to the initially assumed input line. This feed-back connection usually represents the completion of the equality of the equation.

Figure 17:
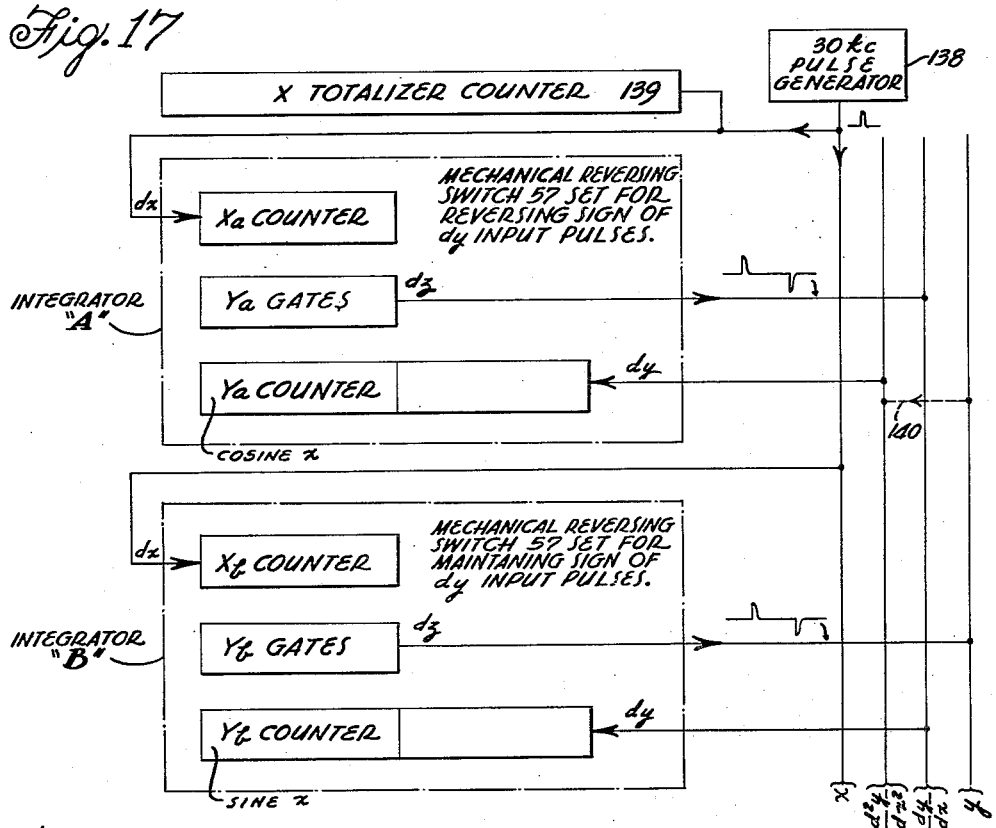
Figure 17 is a schematic hook-up showing how two digital integrating circuits of the present invention are used for generating the sine and cosine functions.

Referring to the schematic of the feed-back system in Figure 17, the conductors carrying the pulse streams corresponding to the variables of the equations are denoted by vertical lines. The first vertical line starting from the left is designated the $x$ line and is connected to receive pulses at a 30 kc. rate from the pulse generator 138. The second vertical line carries pulses from the assumed source and is labelled $$\frac{d^2 y}{dx^2}$$

The third vertical line carries the pulse result of the first integration and is labelled $$\frac{dy}{dx}$$

and the fourth vertical line carries pulses corresponding to the result of the second integration and is labelled $y$.

The first integration, $$\int \frac{d^2 y}{dx^2} dx$$

is performed in integrator A. Thus its $dx$ input is connected to vertical line $x$, and its $dy$ input is connected to the vertical line $$\frac{d^2 y}{dx^2}$$

The output from integrator A is equal to $$z = \int -y\,dx = \int \frac{d^2y}{dx^2}dx = \frac{dy}{dx}$$

and is fed on its $dz$ output to the vertical line labelled $$\frac{dy}{dx}$$

The second integration, $$\int \frac{dy}{dx}dx$$

is performed in integrator B. Thus this latter integrator has its $dx$ input connected to vertical line $x$, and its $dy$ input connected to the vertical line $$\frac{dy}{dx}$$

The output from integrator B is equal to $$z = \int y\,dx = \int \frac{dy}{dx}dx = y$$

and is fed on its $dz$ output to the last vertical line labelled $y$.

The completion of the feed-back loop is made from the last vertical line, representing $y$, to the initially assumed line $$\frac{d^2y}{dx^2}$$

by a jumper 140 shown dashed in Figure 17. It is seen that this latter interconnection represents the completion of the equality $$\frac{d^2y}{dx^2} = -y$$

of the differential equation. The matter of the sign of the terms has yet to be considered.

After interconnecting the integrator circuits in the manner above described, the mechanical reversing switches 57 of the integrator circuits must be properly adjusted.

It is noted that the first integration produces $$\frac{dy}{dx}$$

by receiving a $-y$ $$\left(\text{or } \frac{d^2y}{dx^2}\right)$$

at its $dy$ input. Thus the pulses on the $dy$ input line to integrator A must be properly reversed in sign before being connected by jumper 140 to the $$\frac{d^2y}{dx^2}$$

line. This reversal in signs is obtained instead, without error, by setting the mechanical switch 57 of integrator A so as to cross the lines carrying the positive and negative $dy$ pulses to the complement flip-flop 58 as previously described. The net result is to change the sign of $y$ or $$\frac{d^2y}{dx^2}$$

in the Y counter of integrator A to negative. Integrator A thus produces at its output the desired integration $$\frac{dy}{dx} = -\int \frac{d^2y}{dx^2}dx = \int -y\,dx$$

The $dy$ input to integrator B, however, receives the $$\frac{dy}{dx}$$

output from integrator A without a sign change and hence the mechanical switch 57 for integrator B is set so as to not affect a reversal of sign on this input.

The initial values for the variables must next be placed in the integrators. As previously shown for the equation $$\frac{d^2y}{dx^2} = -y$$

at $$x = 0,\ y = y_{max},\ \frac{dy}{dx} = 0$$

It is known from calculus that for this simple linear differential equation one possible solution is $$y = y_{max}.\ \cos x$$

i. e., the value of $y$ varies as the function of a cosine. Furthermore, $$\frac{dy}{dx} = y_{max}.\ \sin x$$

i. e., the value of the first derivative $$\frac{dy}{dx}$$

varies as the function of a sine. Thus it is noted that the values $y$ and $$\frac{dy}{dx}$$

respectively, are indicated in the $Y_a$ counter and $Y_b$ counters which sums the pulse streams corresponding to these variables.

In order to obtain the highest accuracy possible, it is desirable to let the maximum value $y$ can take during a computation correspond to the maximum capacity of the Y counter. This maximum number corresponds to having a digit one exist in each of the stages of the Y counter.

Thus the initial setting of the $Y_a$ counter is made by placing all of its stage in a digit one condition, since it sums the $y$ variable which is initially a maximum. The initial setting of the $Y_b$ counter, however, is made by triggering all of its stages to a digit zero state since it sums the $$\frac{dy}{dx}$$

variable which is initially equal to zero.

The X totalizer 139 which sums the $x$ pulses is, since $x = 0$, initially, set at zero also.

The generation of the solution to the differential equation is now started by triggering pulse generator 138 which feeds out positive polarity pulses to both integrators simultaneously. The sign associated with the $x$ pulses is considered to be positive and does not change for this particular problem.

Figure 18:
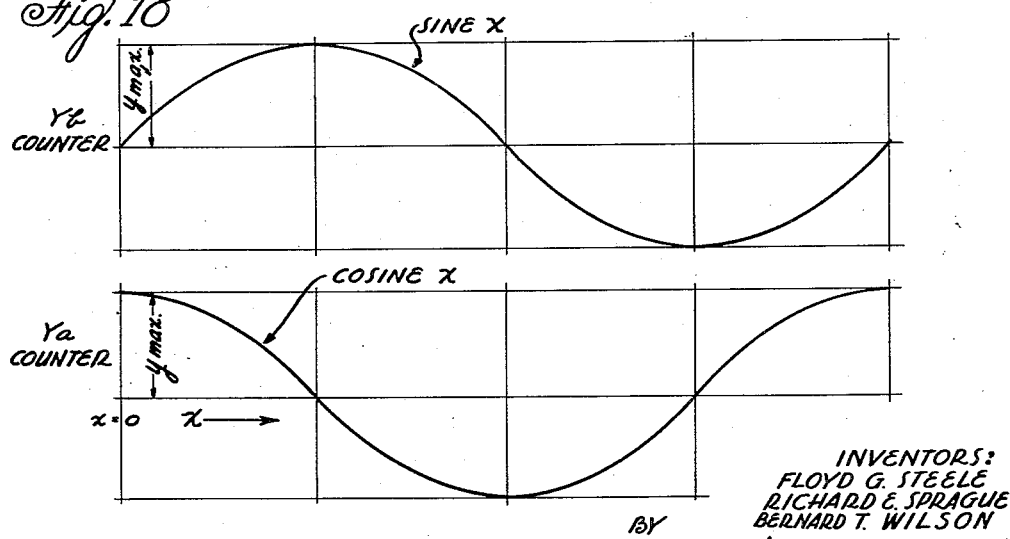
Figure 18 is a graph showing the values of the sine and cosine functions as read in the Y counters of the integrators in Figure 17.

The values of the sine and cosine functions which appear in the $Y_b$ and $Y_a$ counters respectively as the calculation proceeds are shown in graphical form in Figure 18. The ordinates of the graphs correspond to the indicated value of the functions in the counter, and the abscissae of the graph correspond to the summation of $x$ pulses as indicated in X totalizer counter 139.

Referring to integrator A, the initial $x$ pulses from the pulse generator 138 start to cycle out the positive $y$ number initially set in the $Y_a$ counter. These positive pulses from integrator A are immediately impressed on the $Y_b$ counter of integrator B and start to fill it. As evidenced by the $Y_b$ graph, the $x$ pulses from pulse generator 138 simultaneously start to transfer the positive $y$ number in the $Y_b$ counter of integrator B to the output.

The initial positive output pulses from integrator B are made negative, as before noted, in feeding into the $dy$ input of integrator A and thus start to decrease the value of $y$ in integrator A as should be evidenced by the complementing state of the $Y_a$ counter and as shown in the graph of Figure 18.

When the value of $y$ in integrator A reaches zero, a carry pulse is emitted from the last stage of the $Y_a$ counter. This pulse causes the $Y_a$ counter to return to normal operation and triggers its associated sign $y$ flip-flop to cause the pulse output from integrator A to become negative. Thus negative pulses are now received by the $Y_b$ counter, and as seen in Figure 17, the value indicated in the $Y_b$ counter starts decreasing as is further evidenced by its change to a complement state.

It is now clearly revealed that by the use of the neon return circuit 83, as described in connection with Figure 10, the reading of the $y$ contents of the $Y_a$ and $Y_b$ counters, can be made directly by the indicating neons associated with each Y stage. The complementing method of handling decreases in the $y$ number being entirely concealed, so that, as far as the operator can visually detect, the handling of plus and minus increments of $y$ are held in a conventional manner.

By stopping pulse generator 138 at desired intervals of the $x$ pulse accumulation, the values of the sine and cosine function corresponding to these $x$ intervals can be directly read off as binary numbers from their respective counters.

It is thus clearly seen that the present invention provides a novel means and method of performing digital integration. In tests of this device, the sine and cosine function as herein described, were calculated to an accuracy of seventeen significant binary figures using twenty-four binary stages in the Y counter. This is better than a five significant figure decimal accuracy. It should be apparent to those skilled in the art that by providing additional stages in the counters, the accuracy can be increased to a greater order if desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

It should be appreciated that the term "signal indications" as used in the claims refers to physical phenomena which take place in the digital differential analyzer, as for example, the production of electrical signals. As disclosed in the specification in column 37, lines 26 to 28, inclusive, and as used in the claims, the term "independent quantity" refers to the value of $x$— or, in other words, to the quantity whose increments control the production of the $ydx$ increments.

The term "dependent quantity" in the claims refers to the value of $y$— or in other words, the quantity which is combined with the increments of the independent quantity. This is consistent with the terminology used in the specification in column 37, lines 28 to 30, inclusive. The term "differential combination" as used in the claims refers to the $y\Delta x$ increments.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A digital integrator comprising: means for providing digital signal indications representing discrete variations in an independent quantity; means for providing digital signal indications representing a dependent quantity; and means for differentially combining said signal indications representing a dependent quantity and said signal indications representing discrete variations in an independent quantity upon the occurrence of a variation of a discrete amount in one of said quantities.

2. A device including a plurality of integrators according to claim 1; and means for intercoupling said plurality of integrators to generate a solution to a differential equation by the process of integration.

3. A digital integrator comprising: means for providing signal indications representing discrete variations in an independent quantity; means for providing signal indications representing signed variations in a dependent quantity; means for algebraically combining said signal indications representing variations in a dependent quantity to provide signal indications digitally representing the value of a dependent quantity; and means differentially combining said signal indications representing a dependent and an independent quantity upon the occurrence of a variation of a predetermined amount in one of said quantities to provide a digital indication of an output quantity.

4. A device including a plurality of integrators according to claim 3; and means for intercoupling said plurality of integrators to generate a solution to a differential equation by the process of integration.

5. A device according to claim 3 wherein said means for combining said signal indications representing variations in a dependent quantity comprises means for combining said variations in a dependent quantity according to algebraic value.

6. A device according to claim 3 wherein said means for differentially combining said signal indications representing a dependent and an independent quantity comprises means for differentially combining quantities according to algebraic value.

7. A digital integrator comprising: means for providing digital signal indications representing discrete variations in an independent quantity; means for providing digital signal indications representing a dependent quantity; and means for differentially combining said signal indications representing a dependent quantity and said digital signal indications representing discrete variations in an independent quantity upon each occurrence of a variation of a discrete amount in one of said quantities.

8. A digital integrator comprising: means for providing digital signal indications representing discrete variations in an independent quantity; means for providing signal indications representing at least one dependent quantity; and means for differentially combining said signal indications representing a dependent quantity and certain of said signal indications representing discrete variations in an independent quantity upon the occurrence of a variation of a discrete amount in one of said quantities.

9. A digital integrator comprising: means for providing digital signal indications representing discrete variations in at least one independent quantity; means for providing signal indications representing at least one dependent quantity; and means for differentially combining certain of said signal indications representing a dependent quantity and certain of said digital signal indications representing discrete variations in an independent quantity upon the occurrence of a variation of a discrete amount in one of said quantities.

10. A digital integrator comprising: a first storage means to receive and register digital signals indicative of variations in a dependant quantity of a mathematical function during each period of operation of said integrator; a second storage means; transfer means adapted to receive digital signals indicative of variations in an independant quantity of said mathematical function, said transfer means functioning to register in said second storage means certain signals representative of the product of the value currently indicated by signals registered in said first storage means and the value indicated by digital signals received by said transfer means, said transfer means registering said certain signals in said second storage means in the same significance each time said transfer means receives digital signals indicative of a variation in an independent quantity, while preserving signals registered in said first storage means.

11. A digital integrator comprising: a first storage means to accumulate digital signals indicative of variations in a dependant quantity of a mathematical function during each period of operation of said integrator; a second storage means; transfer means adapted to receive digital signals indicative of variations in an independant quantity of said mathematical function, said transfer means functioning to register in said second storage means signals representative of the product of the value currently indicated by signals registered in said first storage means and the value currently indicated by digital signals received by said transfer means, said transfer means registering said certain signals, in said second storage means in the same significance each time said transfer means receives digital signals indicative of a variation in an independent quantity, while preserving signals registered in said first storage means, and means for forming digital signals when signals registered in said second storage means indicate a predetermined value.

12. A digital integrator comprising: a first means to accumulate digital signals indicative of variations in a dependant quantity of a mathematical function during each period of operation of said integrator; second means connected to said first means and adapted to receive digital signals indicative of variations in an independant quantity of said mathematical function during each period of operation of said integrator, said second means functioning to accumulate certain signals proportional to the product of the current value indicated by signals accumulated in said first means and the current value indicated by digital signals received by said second means said certain signals being accumulated by said second means, in said second means in the same significance each time said second means receives digital signals while preserving signals registered in said first means; and third means for forming digital signals when the value indicated by signals accumulated in said second means reaches a predetermined value.

13. An integrating circuit comprising a first binary counter having a plurality of stages: means for introducing a first stream of pulses representing digital variations in an independent quantity, into said first binary counter to provide change in state of different ones of the stages in the counter upon the introduction of successive pulses in the first stream; a second binary counter having substantially twice as many stages as said first binary counter; means for introducing a second stream of pulses into said second binary counter to represent digital variations in a dependent quantity; a plurality of gate circuits each connected to one of the stages of said first counter and connected to a different one of the stages in the second counter in an inverse relationship from the connections to the stages of the first counter, to pass upon a simultaneous occurrence of a change in state in a stage in said first counter and a particular state in an associated stage of said second counter; an output line connected to each of said gate circuits to receive the pulses passing through said gate circuits, and an additional stage connected to the highest order stage of said first binary counter for triggering alternately into first and second states of operation upon the introduction into said first counter of pulses in the first stream; and wherein an additional gate circuit is connected to the additional stage of said first binary counter to pass a pulse upon each triggering of the additional stage in said first counter into said first state of operation.

14. An integrating circuit comprising a first binary counter having a plurality of stages, means for introducing a first stream of pulses representing digital variations in an independent quantity, into said first binary counter to provide a change in state of different ones of the stages in the counter upon the introduction of successive pulses in the first stream, a second binary counter having substantially twice as many stages as said first binary counter, means for introducing a second stream of pulses into said second binary counter to represent digital variations in a dependent quantity, a plurality of gate circuits each connected to one of the stages of said first counter and connected to a different one of the stages in the second counter in an inverse relationship from the connections to the stages in the first counter wherein the highest order stage of said second binary counter is associated in one of said gate circuits with the lowest order stage of said first binary counter, and adjacent lower order stages of said second binary counter are associated in said gate circuits with adjacent higher order stages of said first binary counter, said gate circuits to pass pulses upon a simultaneous occurrence of a change in state in a stage in said first counter and a particular state in an associated stage of said second counter, and an output line connected to each of said gate circuits to receive the pulses passing through said gate circuits which represent the differential combination of said dependent quantity and said independent quantity.

15. An integrator comprising means for providing a first sequence of pulses corresponding to positive and negative increments of a dependent quantity for the integrator, a first counter for obtaining the algebraic summation of the pulses in the first pulse sequence, means for producing variations in said algebraic summations in accordance with the sign represented by the pulses in said first sequence, means for providing a second sequence of pulses corresponding to positive and negative increments of an independent quantity, gate means for passing pulses representing the algebraic summation in accordance with and upon the occurrence of the pulses representing the dependent quantity and means for determining the sign of the pulses passing through the gate means in accordance with the sign of the pulses representing said dependent quantity and the sign of the pulses representing said independent quantity.

16. A digital differential analyzer, including, means for providing digital signal indications representing variations in an independent quantity, means for providing digital signal indications representing a dependent quantity, means for differentially combining the digital signal indications representing the dependent quantity and the variations in the independent quantity upon the occurrence of digital signal indications representing variations in the independent quantity, and means for providing digital signal indications representing differential combination.

17. A digital differential analyzer, including, means for providing digital signal indications representing variations in an independent quantity, means for providing digital signal indications representing a dependent quantity, means for differentially combining the signal indications representing the dependent quantity and the variations in the independent quantity upon the occurrence of signal indications representing variations in the independent quantity to produce digital signal indications representing variations in an output quantity, and means for determining the polarity of each digital variation in the output quantity in accordance with the digital signal indications representing dependent quantity and the variations in the independent quantity.

18. A digital differential analyzer, including, means for providing digital signal indications representing variations in an independent quantity of a mathematical function, means for providing digital signal indications representing variations in a dependent quantity of said function, means for combining the digital signal indications representing the variations in the dependent quantity to provide digital signal indications representing the dependent quantity of said function, means for differentially combining the digital signal indications representing the dependent quantity and the digital signal indications representing variations in the independent quantity upon the occurrence of digital signal indications representing a variation in the independent quantity for the mathematical function to produce digital signal indications representing variations in an output quantity, and means for determining the sign of each variation in said output quantity in accordance with the digital signal indications representing the dependent quantity and in accordance with the digital signal indications representing the variations in the independent quantity.

19. A digital differential analyzer, including, means for providing digital signal indications representing variations in an independent quantity, means for providing digital signal indications representing variations in a dependent quantity, means for combining the signal indications representing variations in the dependent quantity to provide digital signal indications representing the value of the dependent quantity, means for differentially combining the signal indications representing the dependent quantity and the digital signal indications representing variations in the independent quantity upon the occurrence of discrete variations in the independent quantity to provide digital signal indications representing the differential combination, means for providing digital signal indications representing variations in an output quantity every time that the differential combination represented by signal indications exceeds a particular value, and means for providing digital signal indications representing the polarity of each variation in the output quantity.

20. A digital differential analyzer, including, means for providing a first plurality of discrete pulses to represent digital variations in an independent quantity, a first plurality of counters arranged in cascade relationship to provide signal indications from particular ones of the counters upon the occurrence of digital variations in the independent quantity and in accordance with the count of the digital variations, means for providing a second plurality of discrete pulses representing digital variations in a dependent quantity, a second plurality of counters arranged in cascade relationship to provide signal indications digitally representing the count of discrete pulses in the second plurality, a plurality of gate circuits each associated with a particular counter in the first plurality and a particular counter in the second plurality and operative upon each activation of the particular counter in the first plurality to produce output signal indications upon a coincidence in the occurrence of signal indications in the associated counter in the second plurality, and means for operating upon the output signal indications to provide signal indications digitally representing the differential combination of the dependent quantity and the variations in the independent quantity.

21. A digital differential analyzer, including, means for providing a first plurality of discrete pulses representing digital variations in an independent quantity, a first plurality of counters arranged in cascade relationship and operative to provide signal indications from a particular one of the counters upon the occurrence of a digital variation in the independent quantity and in accordance with the cumulative number of digital variations in the independent quantity, means for providing a second plurality of discrete pulses representing digital variations in a dependent quantity, a second plurality of counters arranged in cascade relationship to provide signal indications digitally representing the count of the digital variations in the dependent quantity, a plurality of gate circuits each connected to a particular counter in the first plurality and to a complementary counter in the second plurality operative upon the passage of signal indications from the particular counter in the first plurality and the simultaneous occurrence of signal indications in the complementary counter in the second plurality to provide output signal indications, and means for operating upon the output signal indications to provide signal indications digitally representing the differential combination of the dependent quantity and the variations in the independent quantity.

22. A digital differential analyzer, including, means for providing a first plurality of discrete pulses to represent digital variations in an independent quantity, a first plurality of counters for providing for the passage of a weighted number of signal indications through each counter in accordance with the relative digital importance of the counter in the plurality and upon successive digital variations in the independent quantity, means for providing a second plurality of discrete pulses to represent digital variations in a dependent quantity, a second plurality of counters for providing signal indications digitally representing the count of discrete pulses in the second plurality, a plurality of gate circuits each connected to a particular counter in the first plurality and to the complementary counter in the second plurality to provide output signal indications upon passage of signal indications from a particular counter in the first plurality and a coincidence of signal indications in the associated counter in the second plurality, and a circuit for controlling the output signal indications to indicate the sign of the output signal indications in accordance with the sign of the variations in the independent quantity, and the sign of the dependent quantity to provide signal indications digitally representing the differential combination of the dependent quantity and the variations in the independent quantity.

23. A digital differential analyzer, including, means for providing a first plurality of discrete pulses representing digital variations in an independent quantity, a first plurality of counters for providing for the passage of a weighted number of signal indications through each counter in accordance with the relative digital importance of the counter in the plurality and upon successive digital variations in the independent quantity, means for providing a second plurality of discrete pulses representing digital variations in a dependent quantity, a second plurality of counters for providing signal indications digitally representing the count of discrete pulses in the second plurality, gate means for pairing each counter in the first plurality with the complementary counter in the second plurality of the particular counter in the first plurality to provide output signal indications upon the simultaneous occurrence of signal indications in the associated counters in the first and second pluralities and means operative upon the signal indications passing through the gate means to provide signal indications digitally representing the differential combination of the dependent quantity and the variations in the independent quantity.

24. A digital differential analyzer, including, means for providing a first plurality of discrete pulses representing digital variations in an independent quantity, a first plurality of counters for providing for the progression of signal indications through each counter in accordance with the relative digital importance of the counter in the plurality and upon successive digital variations in the independent quantity, means for providing a second plurality of discrete pulses representing digital variations in a dependent quantity, a second plurality of counters for providing signal indications digitally representing the count of discrete pulses in the second plurality, complementing means operative upon the second plurality of counters to provide a complementary count of the signal indications in the second counters upon a change in the polarity of the digital variations in the dependent quantity as represented by the pulses introduced to the counters, gate means for pairing each counter in the first plurality with a different counter in the second plurality, the gate means being operative to pass signal indications upon the progression of signal indications in said first plurality of counters and the simultaneous occurrence of signal indications in the paired counter in the second plurality, circuit means operative upon the signals passing through the gate means to provide output signal indications digitally representing the differential combination of the dependent quantity and the variations in the independent quantity, and circuit means for determining the polarity of the output signal indications in accordance with the polarity of the dependent quantity as represented by the signal indications in the second counter and the polarity of the digital variations in the independent quantity.

25. A digital differential analyzer, including, means for providing a first plurality of discrete pulses representing digital variations in an independent quantity, a first plurality of counters connected in cascade arrangement to provide for the passage of signal indications through different ones of the counters upon successive digital variations in the independent quantity and for the passage of a weighted number of signal indications through each counter in accordance with the relative disposition of the counter in the cascade arrangement, means for providing a second plurality of discrete pulses representing digital variations in a dependent quantity, a second plurality of counters for providing signal indications digitally representing the algebraic count of discrete pulses in the second plurality, gate means for connecting each counter in the first plurality to a counter in the second plurality, said gate means being operative to pass signal indications upon the passage of signal indications to one of the counters in the first plurality and the simultaneous occurrence of signal indications in a paired counter in the second plurality, a circuit operative to produce a complementation in the signal indications in the second plurality of counters in accordance with the polarity of digital variations in the independent quantity.

26. In a digital differential analyzer, means for providing first signal indications to represent digital variations in the value of a dependent quantity, means for providing second signal indications representing the polarity of the digital variations in the value of the dependent quantity, means for accumulating said first and said second signal indications for providing signal indications digitally reprsenting the resultant value of the dependent quantity, gating means for passing signal indications representing the dependent quantity upon the occurrence of a variation in an independent quantity of a discrete amount, and electrical circuitry operative upon a change in the polarity of the digital variations of the independent quantity to provide a complementary count of the signal indications representing variations in the dependent quantity.

27. In a digital differential analyzer, means for providing signal indications to represent digital variations in the value of a dependent quantity, means for indicating the polarity of the digital variations in the value of the dependent quantity, means for accumulating said digital variations for providing signal indications digitally representing the resultant value of the dependent quantity, gating means for passing the signal indications representing the dependent quantity upon the occurrence of a discrete variation in an independent quantity, and electrical circuitry controlled by the polarity of said dependent quantity and the variations in said independent quantity to provide a complementary count of the signal indications representing the dependent quantity.

28. In a digital differential analyzer, means for providin a plurality of pulses to produce postive and negative variations in the value of a dependent quantity, a pulse separator for distinguishing between the pulses representing positive variations in the value of the dependent quantity and pulses representing negative variations in the value of the dependent quantity, means for providing in a plurality of positions signal indications digitally representing the resultant value of the dependent quantity at any instant, electrical circuitry for detecting the sign of the value of the dependent quantity represented by the signal indications in the plurality of positions, electrical circuitry for providing a complementary count of the signal indications representing the dependent quantity in the plurality of positions, and electrical circuitry for controlling the operation of the complementing circuitry in accordance with the sign of the value of the dependent quantity represented by the signal indications in the plurality of positions and the signal indications provided by the pulse separator.

29. In a digital differential analyzer, means for providing a plurality of pulses to represent positive and negative variations in the value of a dependent quantity, a pulse separator for distinguishing between the pulses representing positive variations in the value of the dependent quantity and pulses representing negative variations in the value of the dependent quantity, means for providing in a plurality of positions signal indications digitally representing the resultant value of the dependent quantity at any instant, a circuit associated with the plurality of positions and operative to indicate the sign of the dependent quantity represented by the signal indications in the plurality of positions, a circuit for complementing the signal indications of the dependent quantity in the plurality of positions, a reversing circuit for controlling the operation of the complementing circuit in accordance with the sign of the dependent quantity represented by the signal indications in the plurality of pulse positions and the signal indications provided by the pulse separator, and connections between the sign indicating circuit and the complementing circuit to prevent the operation of the complementing circuit upon a change in the signal indications provided by the sign indicating circuit and to prevent the operation of the sign indicating circuit upon a complementation of the signal indications in the plurality of pulse positions.

30. A digital differential analyzer, including means for providing signal indications representing discrete variations in an independent quantity of a mathematical function, means for providing signal indications representing discrete variations in a dependent quantity of said function, electrical circuitry for accumulating the signal indications representing the discrete variations in the dependent quantity to provide signal indications digitally representing the dependent quantity of said function, electrical circuitry for differentially combining the signal indications representing the dependent quantity and the variations in the independent quantity upon the occurrence of signal indications representing a discrete variation in the independent quantity, and electrical circuitry for providing signal indications representing discrete variations in the differential combination of said function.

31. A digital differential analyzer, including, means for providing a first series of pulses representing digital variations in an independent quantity of a mathematical function, means for providing a second series of pulses representing digital variations in a dependent quantity of said function, electrical circuitry for algebraically summing the pulses representing variations in the dependent quantity to obtain signal indications representing the dependent quantity, and electrical circuitry for differentially combining the signal indications representing the dependent quantity and the variations in the independent quantity upon the occurrence of pulses representing digital variations in the independent quantity to provide signal indications representing digital variations in an output quantity.

32. An integrator circuit comprising a first counter having a plurality of stages; means for introducing to said first counter a first sequence of pulses having positive and negative polarities representing positive and negative variations in an independent quantity; means for determining the sign of the pulses in said first pulse sequence; means for converting the pulses in said first sequence to a uniform polarity; a second counter having a plurality of stages; means for introducing to said second counter a second pulse sequence having positive and negative polarity pulses to represent positive and negative variations in a dependent quantity; means for introducing to said second counter the pulses of positive and negative polarity in said second sequence, means for providing direct and complementary indications in said second counter; means for arithmetically combining pulses of positive polarity in said second sequence with the direct indications in said counter; means for complementing the direct indications in said second counter upon the introduction of pulses of negative polarity in said second sequence; means for arithmetically combining the pulses of negative polarity in said second sequence with the complementary indications in said counter; means for transferring pulse indications from each stage of said first counter upon the occurrence of pulses representing variations in the independent quantity and in accordance with the pulse indications of associated stages in said second counter to produce a third pulse sequence; an integrator output line; means for passing pulses in said third pulse sequence, obtained during direct indications in said second counter, to said integrator output line; means for subtracting said third pulse sequence, obtained during complementary indications in said second counter, from the converted pulses in said first pulse sequence; means for passing the difference pulses thus obtained to said integrator output line; and means for determining the sign of the pulses in said integrator output line in accordance with the sign determined for the pulses in said first pulse sequence.

33. An integrator circuit comprising a first counter having a plurality of stages, means for introducing into said counter pulses in a first pulse sequence, representing digital variations in an independent quantity, means for providing a second pulse sequence having positive and negative polarity pulses corresponding to their sign, a second counter having a plurality of stages, means for providing an increase in the direct indications in said second counter in accordance with the pulses of positive polarity introduced to said counter, means for providing a complementation of the indications in said second counter upon the production of pulses of negative polarity in said second pulse sequence, means for providing an increase in the complementary indications in said second counter in accordance with the introduction of pulses of negative polarity in said second pulse sequence, means for pairing the pulse indications in each stage of said first counter with the pulse indications in an associated stage in said second counter to generate a third pulse sequence, means for subtracting pulses in said third sequence from pulses in said first sequence, and gating means for providing an operation of said subtracting means upon a complementation of the indications in said second counter.

34. An integrator circuit comprising a first counter having a plurality of stages, means for providing a first pulse sequence having pulses of a uniform polarity, means for introducing the pulses in said first sequence into said counter to provide an indication of the number of pulses, a second counter having a plurality of stages, means for providing a second pulse sequence having pulses of positive and negative polarity, means for introducing to said second counter the pulses of positive and negative polarity in said second sequence, means for providing direct and complementary indications in said second counter, means for complementing the indications in said second counter upon the introduction of pulses of negative polarity in said second sequence, means for arithmetically combining the pulses of positive polarity in said second sequence with the direct indications in said second counter, means for arithmetically combining the pulses of negative polarity in said second sequence with the complementary indications in said second counter, means for combining the pulse indications in each stage of said first counter with the pulse indications in associated stages in said second counter to obtain a third pulse sequence, an integrator output line, means for passing to said integrator output line the pulses in said third pulse sequence obtained upon a direct indication in said second counter, means for subtracting from said third pulse sequence the pulses in said third pulse sequence obtained during complementary indications in said second counter, means for passing to said integrator output line the difference pulses thus obtained, means for providing an overflow pulse from said second counter to indicate a change in polarity of the indications in said second counter, means for reversing the polarity of pulses intended for arithmetical combination with the direct and complementing indications in said second counter upon a change in the polarity of the number represented by indications in said counter, and means for determining the polarity of the pulses in said integrator output line in accordance with the polarity of the indications in said second counter.

35. An integrator circuit comprising means for providing a first pulse sequence having positive and negative polarity pulses to indicate variations in an independent quantity, first means for storing the sign of the pulses in said first pulse sequence, a first counter having a plurality of stages, means for converting the pulses in said first sequence to a uniform polarity, means for introducing the pulses in said first pulse sequence to said counter after the conversion of the pulses to a uniform polarity, means for providing a second pulse sequence having positive and negative polarity pulses to indicate variations in a dependent quantity, a second counter having a plurality of stages, means for providing direct and complementary indications of the dependent quantity in the stages of said second counter, means for providing an increase in the direct indications in said second counter upon the introduction of pulses having a positive polarity in said second pulse sequence, means for complementing the indications in said second counter upon the introduction of pulses having a negative polarity in said second pulse sequence, means for comparing the pulsed condition of each stage in said first counter with the pulsed condition of an associated stage in said second counter and for passing a pulse upon the simultaneous occurrence of a pulsed condition in a pair of associated stages, an integrator output line, means for passing to said integrator output line said third pulse sequence obtained during a direct indication in said second counter, means for determining the difference between the number of pulses in said third pulse sequence during complementary indications in said second counter and the number of converted pulses in said first pulse sequence, means for passing the difference indications thus obtained to said integrator output line, means for determining the polarity of the indications in said second counter in accordance with any over-flow pulses from said second counter, means triggered by said over-flow pulses for reversing the polarity of pulses in the second sequence that are combined with the direct and complementary indications in said second counter, and means for determining the polarity of the pulses in said integrator output line in accordance with the pulses in said first and second pulse sequences.

36. An integrator circuit comprising means for providing a first pulse sequence having pulses of positive and negative polarity to represent digital variations in an independent quantity, a first binary counter having a plurality of stages, first pulse separating means for introducing to said first counter pulses of positive and negative polarity in said first sequence as pulses of a uniform polarity, first memory means for providing signal indications representing the sign of the pulses in said first pulse sequence, means for providing a second pulse sequence having pulses of positive and negative polarity to represent digital variations in a dependent quantity, a second binary counter having a greater number of stages than said first counter, second pulse separating means for introducing to said second counter pulses of positive and nevative polarity from said second sequence as pulses of uniform polarity, a plurality of gates, each gate in said plurality being connected to one of the stages of higher order in said second counter and to one of the stages in said first counter, a common output line connected to said gates to receive a signal upon each coincidence of a positive indication in a pair of associated stages in the first and second counters, a bistable member having two states of operation and adapted to be triggered from one state of operation into the other upon a change in the polarity of the pulses in said second sequence, means associated with said second counter for producing a complementation in the indications in said counter upon the triggering of said member, an integrator output line, direct and complementary trunks connected between said common output line and said integrator output line, means in said complementary trunk for subtracting pulses in said common output line from pulses emitted from said first separating means, gating means in said direct trunk, gating means in said complementary trunk, said direct gating means being connected to said bistable member to pass pulses for one state of operation of said bistable member, said complementary gating means being connected to said bistable member to pass pulses for the other state of operation of said bistable member, second memory means connected to said second counter for triggering by an overflow pulse from said counter to provide an indication of the sign of the indications in said counter, means for triggering said bistable member from one state of operation to the other state of operation upon a change in the polarity of pulses in said second sequence and upon a triggering of said second memory means, and means for determining the polarity of the pulses in said integrator output line in accordance with the indications provided by said first and second memory means.

37. Apparatus in accordance with claim 36 wherein a reversing switch is provided for reversing the polarity of the pulses which produce a triggering of said bistable member from one given state of operation to the other state of operation.

38. Apparatus in accordance with claim 36 wherein circuit means are provided for restraining the operation of said bistable member and said second memory means upon the passage of an overflow pulse from said counter during the complementary operation of said counter and for preventing the indications in said second counter from being complemented upon the triggering of said bistable member as a result of an overflow pulse from said counter.

39. Apparatus in accordance with claim 36 wherein a delay circuit is provided for delaying the pulses introduced to said second counter to prevent any adverse effects from transients resulting from the complementation of the indications in said counter.

40. Apparatus in accordance with claim 36 wherein an additional stage is provided in said first counter, said additional stage being connected to said common output line to feed into said line alternate pulses introduced to said stage.

41. Apparatus in accordance with claim 36 wherein means are provided for making the indications in the second counter visually available to show the actual number represented by the indications in both the direct and complementary states of operation of said second counter.

42. Apparatus in accordance with claim 36 including a plurality of neon lights each connected to a different stage of said second counter, and means for energizing the neon light in each stage upon a positive indication in the stage for direct indications in the counter and upon a negative indication in the stage for complementary indications in the counter.

43. A digital differential analyzer, including, means for providing a first sequence of pulses to represent digital variations in an independent quantity, means for providing signal indications to represent the polarity of the digital variations in the independent quantity, a plurality of activating means for providing signal indications from different ones of the activating means upon the occurrence of successive digital variations in the independent quantity, means for providing a second sequence of pulses to represent digital variations in a dependent quantity, a plurality of means for counting the pulses in the second sequence and for providing signal indications digitally representing the count at any instant, means for providing signal indications representing the polarity of the count in the plurality of counting means, gate means for passing the signal indications from one of the counting means dependent upon the passage of signal indications from a particular one of the activating means, and means for operating upon the signals passing through the gate means in accordance with the signal indications representing the polarity of the dependent quantity and the signal indications representing the polarity of the variations in the independent quantity at any instant to provide signal indications digitally representing the differential combination of the dependent quantity and the variations in the independent quantity.

44. A digital differential analyzer, including, means for providing a first sequence of pulses to represent digital variations in an independent quantity, means for providing signal indications representing the polarity of the digital variations in the independent quantity, a first plurality of means for counting the pulses in the first sequence and for activating a particular one of the counting means dependent upon the count at any instant, means for providing a second sequence of pulses to represent digital variations in a dependent quantity, a second plurality of means for counting the pulses in the second sequence and for providing signal indications digitally representing the count at any instant, means for providing a complementary count of the signal in the second plurality of counting means upon each change in the polarity of the digital variations in the dependent quantity as represented by the pulses in the second sequence, gate means for providing for a passage of the signal indications in a particular one of the second counting means dependent upon the activated one of the first counting means to produce output signal indications, and means for determining the polarity of the output signal indications in accordance with the polarity of the count in the second plurality of means and the polarity of the digital variations in the independent quantity.

45. A digital differential analyzer, including, means for providing a first plurality of discrete pulses to represent digital variations in an independent quantity, a first plurality of counters arranged in cascade relationship and operative to provide signal indications from different ones of the counters upon successive occurrences of digital variations in the independent quantity, means for providing a second plurality of discrete pulses to represent digital variations in a dependent quantity, a second plurality of counters arranged in cascade relationship to provide signal indications digitally representing the count of discrete pulses in the second plurality, a plurality of gate circuits each adapted to pass the signal indications from a particular counter in the second plurality upon the passage of signal indications from a particular counter in the first plurality, complementing circuits for operating upon the counters in the second plurality in accordance with the polarity of the digital variations in the dependent quantity, and means for operating upon the signals passing through the gate circuits to provide signal indications digitally representing the differential combination of the dependent quantity and the digital variations in the independent quantity.

46. A digital differential analyzer, including, means for providing signal indications to represent digital variations in an independent quantity, means for providing signal indications to represent digital variations in a dependent quantity, means for accumulating said signal indications to represent digital variations in the dependent quantity for providing signal indications digitally representing the algebraic combination of the digital variations in the dependent quantity, means for differentially combining the signal indications representing the algebraic combination and the variations in the independent quantity upon the occurrence of signal indications representing digital variations in the independent quantity to provide signal indications digitally representing an output quantity, and means for providing signal indications digitally representing the differental combinaton every time that the output quantity exceeds a particular value.

47. A digital differential analyzer, including, means for providing signal indications to represent digital variations in an independent quantity of a mathematical function, electrical circuitry for providing signal indications representing the polarity of the digital variations in the independent quantity, means for providing signal indications to represent digital variations in a dependent quantity of the mathematical function, electrical circuitry for combining the signal indications representing the digital variations in the dependent quantity to provide signal indications digitally representing the cumulative value of the dependent quantity, electrical circuitry for providing signal indications representing the polarity of the cumulative value of the dependent quantity, electrical circuitry for differentially combining the signal indications representing the dependent quantity and the digital variations in the independent quantity upon the occurrence of signal indications representing digital variations in the independent quantity and in accordance with the signal indications representing the dependent quantity and the polarity of the dependent quantity and with the signal indications representing the digital variations in the independent quantity and the polarity of such digital variations, and electrical circuitry for providing signal indications digitally representing the differential combination of the mathematical function.

48. A digital differential analyzer, including, means for providing signal indications to represent digital variations in an independent quantity of a mathematical function, means for providing signal indications to represent digital variations in a dependent quantity of the mathematical function, electrical circuitry for combining the signal indications representing the digital variations in the dependent quantity to provide signal indications digitally representing the value of the dependent quantity, electrical circuitry for differentially combining the signal indications digitally representing the dependent quantity and the variations in the independent quantity upon the occurrence of signal indications representing digital variations in the independent quantity, electrical circuitry for providing signal indications digitally representing the differential combination of the mathematical relationship, and electrical circuitry for providing signal indications digitally combined with the signal indications representing the differential combination for the mathematical function, to effect trapezoidal correction.

49. A digital differential analyzer, including, means for providing signal indications to represent digital variations in an independent quantity of a mathematical function, means for providing signal indications to represent the polarity of each digital variation in the independent quantity, means for providing signal indications to represent digital variations in a dependent quantity of the mathematical function, electrical circuitry for combining the signal indications representing the digital variations in the dependent quantity to provide signal indications digitally representing the value of the dependent quantity, electrical circuitry for providing signal indications to represent the polarity of the dependent quantity, electrical circuitry for combining the signal indications representing the dependent quantity and the variations in the independent quantity upon the occurrence of signal indications representing digital variations in the independent quantity and in accordance with the signal indications representing the polarity of the dependent quantity and the variations in the independent quantity to provide signal indications digitally representing the differential combination of the mathematical relationship, and electrical circuits for providing signal indications digitally altering the differential combination upon each occurrence of signal indications representing a particular number of digital variations in the independent quantity to effect trapezoidal correction.

50. A digital differential analyzer, including, a plurality of integrators comprising means for providing digital signal indications representing variations in an independent quantity of a mathematical function, means for providing digital signal indications representing a dependent quantity of a mathematical function, means for differentially combining the signal indications representing the dependent quantity and the variations in the independent quantity upon the occurrence of discrete variations in the independent quantity to produce output signal indications, and means for introducing the output signal indications from each integrator to other integrators.

51. A digital differential analyzer, including, at least one integrator comprising: means for providing for each integrator digital signal indications representing variations in an independent quantity, means for providing for each integrator digital signal indications representing a dependent quantity, means for differentially combining the signal indications representing the dependent quantity and the variations in the independent quantity upon the occurrence of discrete variations in the independent quantity to produce digital signal indications representing the differential combination, means for providing digital signal indications representing a predetermined value as represented by the signal indications representing the differential combination.

52. A digital differential analyzer, including a plurality of integrators which comprise: means for providing for each integrator digital signal indications representing variations in an independent quantity, means for providing for each integrator digital signal indications representing a dependent quantity, means for differentially combining the signal indications representing the dependent quantity and the variations in the independent quantity upon the occurrence of discrete variations in the independent quantity, means for providing from each integrator digital signal indications representative of the differential combination, means for providing an interconnection between the integrators in accordance with the differential problem requiring solution.

53. A digital differential analyzer, including a plurality of integrators each comprising means for providing digital signal indications representing variations in an independent quantity, means for providing digital signal indications representing a dependent quantity, means for providing the differential combination of the signal indications representing the dependent quantity and the variations in the independent quantity upon the occurrence of discrete variations in the independent quantity, and further comprising means for varying the signal indications repersenting the value of the dependent quantity for each integrator in accordance with the signal indications representing the values of the differential combination for certain integrators dependent upon the problem to be solved.

54. A digital differential analyzer, including a plurality of integrators each comprising means for providing digital signal indications repersenting variations in an independent quantity, means for providing digital signal indications representing variations in a dependent quantity, means for differentially combining the signal indications representing the dependent quantity and the variations in the independent quantity upon the occurrence of discrete variations in the independent quantity to produce signal indications representing the differential combination from the integrator, and further including means for producing the signal indications repersenting the variations in the dependent quantity for each integrator in accordance with the signal indications representing the values of the differential combinations for certain integrators dependent upon the problem to be solved.

55. In a digital differential analyzer a plurality of integrators each comprising means for receiving signal indications digitally representing an independent quantity, means for receiving signal indications representing digital increments in the dependent quantity, means for forming signal indications digitally representing the differential combination of the dependent quantity and digital variations in an independent quantity, and means for producing digital signals representing increments in the dependent quantity for certain of said integrators in accordance with the signal indications representing the differential combination of other of said integrators dependent upon the problem to be solved.

56. A digital differential analyzer, including a plurality of integrators each comprising: means for receiving digital signal indications representing variations in an independent quantity, means for receiving digital signal indications representing a dependent quantity, means for differentially combining the signal indications representing the dependent quantity and the variations in the independent quantity for each integrator upon the occurrence of discrete variations in the independent quantity for the integrator, means for providing for each integrator digital signal indications representing the differential combination for the integrator, means for providing for the introduction to certain integrators of the digital signal indications digitally representing the differential combination from other of the integrators dependent upon the problem to be solved.

57. A digital differential analyzer including a plurality of integrators each comprising: means for receiving digital signal indications representing variations in an independent quantity, means for providing digital signal indications representing variations in a dependent quantity, means for combining the signal indications representing the variations in the dependent quantity for each integrator to produce digital signal indications representing the dependent quantity for each integrator, means for differentially combining the signal indications representing the dependent quantity and the variations in the independent quantity for each integrator upon the occurrence of discrete variations in the independent quantity for the integrator, and means for producing the signal indications representing the variations in the independent and dependent quantities for certain integrators in accordance with the signal indications representing the differential combination of other integrators dependent upon the problem to be solved.

58. A digital differential analyzer including a plurality of integrators comprising: means for receiving digital signal indications representing variations in an independent quantity, means for receiving signal indications representing the polarity of the variations in the independent quantity, means for receiving digital signal indications repersenting variations in a dependent quantity, means for combining the digital signal indications representing the variations in the dependent quantity to produce digital signal indications representing the dependent quantity, means for receiving signal indications representing the polarity of the dependent quantity, means for combining the signal indications representing the dependent quantity and the variations in the independent quantity for each integrator upon the occurrence of discrete variations in the independent quantity for the integrator and in accordance with the polarity of the dependent quantity and the variations in the independent quantity to provide digital signal indications representing variations in an output quantity, and means for introducing the digital signal indications representing the variations in the output quantity of certain of said integrators to other of said integrators as the digital signal indicating repersenting variations in the independent and dependent quantities in accordance with a problem to be solved.

59. A digital differential analyzer including a plurality of integrators each comprising: means for receiving digital signal indications representing variations in an independent quantity, means for receiving signal indications representing the polarity of the signal indications representing variations in the independent quantity, means for receiving digital signal indications representing variations in a dependent quantity, means for combining the signal indications representing the variations in the dependent quantity to produce digital signal indications representing the dependent quantity for the integrator, means for registering signal indications representing the polarity of the dependent quantity for each integrator, means for differentially combining the signal indications representing the dependent quantity and the variations in the independent quantity for each integrator upon the occurrence of digital signal indications representing discrete variations in the independent quantity for the integrator and in accordance with the polarity of the dependent quantity and the variations in the independent quantity for the integrator, means for providing signal indications digitally representing the differential combination for each integrator, and means for interconnecting the integrators in a pattern dependent upon the problem requiring solution to obtain an introduction of the signal indications representing the differential combination from certain integrators to other integrators as the signal indications representing variations in the independent and dependent quantities.

60. A digital differential analyzer, including a plurality of integrators each comprising: means for receiving signal indications to represent digital variations in an independent quantity, means for receiving signal indications to represent digital variations in a dependent quantity, a plurality of counters for counting the digital variations in the dependent quantity as represented by the signal indications digitally representing the dependent quantity, gate means connected to the counters to provide output signal indications from the integrator upon the occurrence of signal indications representing digital variations in the independent quantity for the integrator, and means for providing an interconnection between the integrators to obtain an introduction of the output signal indications from each integrator to certain other integrators in accordance with a problem to be solved and in representation of the digital variations in the independent and dependent quantities for the other integrators.

61. A digital differential analyzer, including a plurality of integrators each comprising: means for receiving signal indications to represent digital variations in an independent quantity, means for receiveing signal indications to represent the polarity of the digital variations in the independent quantity, means for receiving signal indications to represent digital variations in a dependent quantity, a plurality of counters for counting the digital variations in the dependent quantity received by each integrator as represented by the signal indications digitally representing the dependent quantity, means associated with the counters for providing signal indications representing the polarity of the dependent quantity registered in the counters, gate means connected to the counters to provide output signal indications from each integrator upon the occurrence of digital variations in the independent quantity received by the integrator, means for operating upon the output signal indications from each integrator in accordance with the signal indications representing the polarity of the dependent quantity and of the variations in the independent quantity received by the the integrator to provide signal indications representing digital variations in the differential combination of the dependent quantity and the variations in the independent quantity for the integrator, and means for introducing the last mentioned signal indications for each integrator to certain other integrators in a pattern dependent upon a problem to be solved for utilization as the signal indications representing the digital variations in the independent and dependent quantities for the integrators.

62. A digital differential analyzer, including a plurality of integrators each comprising: means for receiving signal indications to represent digital variations in an independent quantity, a first plurality of counters interconnected to provide for the passage through each counter of a weighted number of signal indications in accordance with the relative digital importance of the counter in the plurality of upon successive digital variations in the independent quantity received by the integrator, means for receiving signal indications to represent digital variations in a dependent quantity, a second plurality of counters for registering signal indications digitally representing the dependent quantity for the integrator, a plurality of gate circuits each connected to a particular counter in the first plurality and to the complementary counter in the second plurality to provide output signal indications from the integrator upon a passage of signal indications from a particular counter in the first plurality and a coincidence of signal indications in the associated counter in the second plurality, and means for providing an interconnection between different integrators in accordance with a problem requiring solution to obtain an introduction to each integrator of the output signal indications from certain other integrators in representation of the digital variations in the independent and dependent quantities.

63. A digital differential analyzer, including a plurality of integrators each comprising: means for receiving signal indications to represent digital variations in an independent quantity for each integrator, means for receiving signal indications representing the polarity of the variations in the independent quantity for each integrator, a first plurality of counters arranged in cascade relationship for each integrator, to provide signal indications from particular ones of the counters upon the occurrence of digital variations in the independent quantity for the integrator and in accordance with the count of the digital variations in the independent quantity for the integrator, means for providing signal indications representing digital variations in a dependent quantity for each integrator, a second plurality of counters arranged in cascade relationship for each integrator to provide signal indications digitally representing the dependent quantity for the integrator, means for providing signal indications representing the polarity of the count for each integrator in the second plurality of counters, a plurality of gate circuits each associated for each integrator with a particular counter in the first plurality and a particular counter in the second plurality and operative upon the activation of the particular counter in the first plurality to produce output signal indications for the integrator upon a coincidence in the occurrence of signal indications in the associated counter in the second plurality for the integrator, means for operating upon the output signal indications for each integrator in accordance with the signal indications representing the polarity of the dependent quantity and of the variations in the independent quantity for the integrator to provide signal indications representing the differential combination of the dependent quantity and the variations in the indepedent quantity for the integrator, and said differential analyzer further including means for interconnecting the different integrators in a pattern dependent upon a problem requiring solution to obtain the introduction to each integrator of the signal indications representing the differential combination from certain of the integrators for use as the digital variations in the independent and dependent quantities for the integrators.

64. A digital differential analyzer, including a plurality of integrators, electrical circuitry for providing an interconnection between different integrators in the plurality in accordance with a problem requiring solution to obtain the introduction to each integrator of digital signal indications representing output quantities from other integrators in the plurality in representation of variations in an independent quantity for the integrator and in a dependent quantity for the integrator, each of said integrators including electrical circuitry for combining the signal indications representing the variations in the dependent quantity to provide digital signal indications representing the dependent quantity for the integrator, and electrical circuitry for combining the digital signal indications representing the dependent quantity and the variations in the independent quantity for each integrator upon the occurrence of discrete variations in the independent quantity for the integrator to obtain signal indications representing an output quantity for the integrator.

65. A digital differential analyzer, including a plurality of integrators each comprising: means for receiving signal indications representing digital variations in an independent quantity to each integrator, means for receiving signal indications representing digital variations in a dependent quantity to each integrator, electrical circuitry for accumulating the signal indications representing the digital variations in the dependent quantity applied to each integrator to obtain signal indications digitally representing the dependent quantity for the integrator, electrical circuitry for providing a complementary count of the signal indications representing the digital variations in the dependent quantity for each integrator upon a change in the polarity of the digital variations in the dependent quantity for the integrator as represented by the signal indications, electrical circuitry for providing signal indications representing the polarity of the dependent quantity for each integrator at any instant, electrical circuitry for providing signal indications representing the polarity of the variations in the independent quantity for each integrator, electrical circuitry for combining the signal indications representing the dependent quantity and the variations in the independent quantity for each integrator upon the occurrence of digital variations in the independent quantity for the integrator and in accordance with the polarity of the dependent quantity and the variations in the independent quantity for the integrator to produce output signal indications for the integrator, and electrical circuitry for passing to each integrator the output signals from certain other integrators in a pattern dependent upon the problem requiring solution for use as the signal indications representing the variations in the independent and dependent quantities for the integrator.

66. A digital differential analyzer, including, means for providing digital signal indications representing variations in an independent quantity for an integrator, means for providing digital signal indications representing variations in a dependent quantity for the integrator, counter means for combining the signal indications representing the variations in the dependent quantity for the integrator to provide signal indications representing the dependent quantity for the integrator, means for providing digital signal indications digitally representing a correction in the value of the dependent quantity over the range of values produced during a particular period measured by variations in the independent quantity, means for combining the signal indications representing the dependent quantity and the variations in the independent quantity for the integrator upon the occurrence of digital signal indications representing variations in the independent quantity to produce output signal indications, and means for adjusting the output indications in accordance with the correction in the value of the dependent quantity.

67. A digital differential analyzer, including, means for providing signal indications representing digital variations in the value of an independent quantity, means for providing signal indications representing digital variations in the value of a dependent quantity, electrical circuitry for combining the signal indications representing the variations in the dependent quantity to produce signal indications digitally representing the dependent quantity, electrical circuitry for providing a complementary count of the digital variations in the dependent quantity upon a change in the polarity of the digital variations as represented by the signal indications for the variations, electrical circuitry for providing signal indications for varying the value of the dependent quantity to effect trapezoidal correction, and electrical circuitry for differentially combining the signal indications representing the varied value of the dependent quantity and the variations in the independent quantity upon the occurrence of variations in the independent quantity to produce output signal indications representing the differential combination.

68. A digital differential analyzer, including, means for providing signal indications representing digital variations in an independent quantity of a mathematical function, means for providing signal indications representing digital variations in a dependent quantity of the mathematical function, electrical circuitry for combining the signal indications representing the digital variations in the dependent quantity in accordance with the polarity of the digital variations in a dependent quantity, electrical circuitry for combining the signal indications representing the dependent quantity and the variations in the independent quantity of the mathematical function upon the occurrence of digital variations in the independent quantity and in accordance with the polarity of the dependent quantity and the variations in the independent quantity as represented by the signal indications, and electrical circuitry operative upon the occurrence of digital variations in the independent quantity to provide signal indications effecting a variation in the differential combination resulting from changes in the value of the dependent quantity during the periods between successive variations in the independent quantity for trapezoidal correction.

69. A digital differential analyzer, including, means for providing digital signal indications representing variations in an independent quantity of a mathematical function, means for providing digital signal indications representing variations in a dependent quantity of the mathematical function, means for combining the signal indications representing the variations in the dependent quantity to produce digital signal indications continuously representing the dependent quantity, means for differentially combining the signal indications representing the dependent quantity and the variations in the independent quantity of the mathematical function upon the occurrence of discrete variations in the independent quantity, and means operative upon the occurrence of discrete variations in the independent quantity to provide signal indications representing a first order approximation of the correction required in the differential combination as a result of changes in the value of the dependent quantity during the periods between successive variations in the independent quantity.

70. A digital differential analyzer, including, means for providing signal indications representing digital variations in the value of an independent quantity of a mathematical function, means for providing signal indications representing digital variations in the value of a dependent quantity of the mathetmatical function, means for combining the signal indications representing the digital variations in the dependent quantity to produce signal indications digitally representing the dependent quantity, means for combining the signal indications representing the dependent quantity and the variations in the independent quantity upon the occurrence of variations in the independent quantity to produce signal indications representing the differential combination in the mathematical function, means for providing signal indications digitally for varying the value of the dependent quantity over the range of values represented to effect trapezoidal correction of the differential combination of the mathematical function.

71. A digital differential analyzer, including a plurality of integrators each comprising: means for providing signal indications representing digital variations in an independent quantity for each integrator, means for providing signal indications representing digital variations in a dependent quantity for each integrator, means for combining the signal indications representing the variations in the dependent quantity for each integrator to produce signal indications digitally representing the dependent quantity for the integrator, means for differentially combining the signal indications representing the dependent quantity and the variations in the independent quantity for each integrator upon the occurrence of signal indications representing digital variations in the independent quantity for the integrator to produce signal indications representing the differential combination for the integrator, means for providing output signal indications representing the differential combination for each integrator, means for introducing the output signal indications from each integrator to certain other integrators dependent upon a problem to be solved and in representation of digital variations in the independent and dependent quantities for the integrators, and means for introducing signal indications to each integrator to vary the signal indications representing the differential combination for the integrator to effect trapezoidal correction.

72. A digital differential analyzer, including a plurality of integrators, means for providing an interconnection between the integrators in accordance with a problem to be solved, wherein output signal indications from certain of the integrators are applied to other integrators in representation of digital variations in an independent quantity, and a dependent quantity each of said integrators including: electrical circuitry for combining the signal indications representing the variations in the dependent quantity for each integrator to produce signal indications digitally representing the dependent quantity for the integrator, electrical circuitry for providing a complementary count of the digital variations in the dependent quantity upon a change in the polarity of the variations as represented by the signal indications for the variations, electrical circuitry for differentially combining the signal indications representing the dependent quantity and the variations in the independent quantity upon the occurrence of digital variations in the independent quantity for the integrator to produce signal indications representing a differential combination for the integrator, and electrical circuitry for providing output signal indications representing the differential combination for each integrator.

73. A digital differential analyzer, including, a plurality of integrators, means for providing signal indications to represent digital variations in an independent quantity for each integrator, means for providing signal indications to represent digital variations in a dependent quantity for each integrator, each of said integrators including: a plurality of counters operative upon the signal indications representing the digital variations in the dependent quantity for each integrator to provide signal indications digitally representing the dependent quantity for the integrator, a plurality of gate circuits associated with the counters to pass signal indications from the counters for each integrator upon the occurrence of digital variations in the independent quantity for the integrator, means for operating on the signal indications passing through the gate circuits to provide for each integrator signal indications digitally representing the differential combination of the dependent quantity and the variations in the independent quantity for the integrator, means for introducing the last mentioned signal indications for each integrator to certain other integrators in a pattern dependent upon a problem requiring solution for use as the signal indications representing the digital variations in the independent and dependent quantities for the integrators, and means for producing signal indications to vary the value of the differential combination for each integrator to compensate for changes in the value of the dependent quantity for the integrator over the period between pairs of digital variations in the independent quantity for the integrator.

References Cited in the file of this patent
UNITED STATES PATENTS

| | | |
|---|---|---|
| 2,137,133 | Dallman | Nov. 15, 1938 |
| 2,398,238 | McNatt | Apr. 9, 1946 |
| 2,404,047 | Flory | July 16, 1946 |
| 2,409,689 | Morton | Oct. 22, 1946 |
| 2,429,228 | Herbst | Oct. 21, 1947 |
| 2,533,242 | Gridley | Dec. 12, 1950 |
| 2,540,551 | Shenk | Feb. 6, 1951 |
| 2,604,262 | Phelps | July 22, 1952 |
| 2,621,292 | White | Dec. 9, 1952 |
| 2,623,115 | Woods-Hill | Dec. 23, 1952 |
| 2,623,171 | Woods-Hill | Dec. 23, 1952 |
| 2,672,284 | Dickinson | Mar. 16, 1954 |
| 2,719,670 | Jacobs | Oct. 4, 1955 |
| 2,725,191 | Ham | Nov. 29, 1955 |
| 2,726,038 | Ergen | Dec. 6, 1955 |

OTHER REFERENCES

Electronics, November 1950, "32-channel high-speed commutator," by Alpert et al., pages 94 to 97.

Proc. IRE, "An electronic differential analyzer," by Macnee, vol. 37, No. 11, November 1949, pages 1315 to 1324.

"A new type of differential analyzer," by V. Bush, Journal of the Franklin Institute, October 1945, pages 254–326.

"A digital computer for scientific applications," by C. F. West and J. E. De Turk, Proceedings of the IRE, pages 1452–1460.